United States Patent
Bendtsen et al.

(10) Patent No.: US 10,203,103 B2
(45) Date of Patent: Feb. 12, 2019

(54) LED LUMINAIRE HAVING ENHANCED THERMAL MANAGEMENT

(71) Applicant: Cree, Inc., Durham, NC (US)

(72) Inventors: Andrew Bendtsen, Racine, WI (US); Kurt Wilcox, Libertyville, IL (US); Boris Karpichev, Libertyville, IL (US); John Durkee, Raleigh, NC (US); John Roberts, Durham, NC (US); David Goelz, Milwaukee, WI (US); Douglas E. Keiter, Apex, NC (US); Randy Bernard, Cary, NC (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 15/018,606

(22) Filed: Feb. 8, 2016

(65) Prior Publication Data
US 2017/0227208 A1    Aug. 10, 2017

(51) Int. Cl.
*F21V 15/01*    (2006.01)
*F21V 23/00*    (2015.01)
(Continued)

(52) U.S. Cl.
CPC ............ *F21V 29/83* (2015.01); *F21S 8/00* (2013.01); *F21V 17/16* (2013.01); *F21V 23/007* (2013.01); *F21V 29/508* (2015.01); *F21V 29/74* (2015.01); *H05B 33/0803* (2013.01); *H05B 37/0218* (2013.01); *H05B 37/0227* (2013.01); *F21V 5/007* (2013.01); *F21V 5/045* (2013.01);
(Continued)

(58) Field of Classification Search
CPC ................................. F21V 29/83; F21V 5/007
See application file for complete search history.

(56) References Cited

U.S. PATENT DOCUMENTS

| | | | |
|---|---|---|---|
| 7,871,184 B2 * | 1/2011 | Peng | F21K 9/233 361/703 |
| 8,342,714 B1 | 1/2013 | Rea et al. | |

(Continued)

FOREIGN PATENT DOCUMENTS

| | | |
|---|---|---|
| EP | 2868965 B1 | 12/2016 |
| JP | 2001291419 A | 10/2001 |

(Continued)

OTHER PUBLICATIONS

International Search Report corresponding to International Application No. PCT/US2017/016725, conducted by the ISA/EP, 8 pages.

(Continued)

*Primary Examiner* — Alexander Garlen
(74) *Attorney, Agent, or Firm* — J. Clinton Wimbish; Nexsen Pruet, PLLC

(57) ABSTRACT

In one aspect, luminaires are described herein enabling independent thermal management of driver and LED assemblies. For example, a luminaire comprises a driver assembly vertically integrated with a LED assembly, the driver assembly comprising a driver heatsink having an interior in which a circuit board assembly is positioned, and the LED assembly comprising an array of LEDs and LED heatsink, wherein a barrier is positioned between the driver heatsink and the LED heatsink, separating convective cooling of the driver assembly from convective cooling of the LED assembly.

29 Claims, 34 Drawing Sheets

(51) Int. Cl.

| | | |
|---|---|---|
| *F21V 23/04* | (2006.01) | |
| *F21V 29/74* | (2015.01) | |
| *F21V 31/00* | (2006.01) | |
| *F21V 5/04* | (2006.01) | |
| *F21V 7/00* | (2006.01) | |
| *H05B 33/08* | (2006.01) | |
| *F21V 29/83* | (2015.01) | |
| *F21V 17/16* | (2006.01) | |
| *H05B 37/02* | (2006.01) | |
| *F21S 8/00* | (2006.01) | |
| *F21V 29/508* | (2015.01) | |
| *F21V 29/89* | (2015.01) | |
| *F21V 13/04* | (2006.01) | |
| *F21V 23/06* | (2006.01) | |
| *F21Y 115/10* | (2016.01) | |
| *F21V 5/00* | (2018.01) | |
| *F21W 131/10* | (2006.01) | |
| *F21Y 113/00* | (2016.01) | |
| *F21Y 105/10* | (2016.01) | |

(52) U.S. Cl.
CPC .............. *F21V 7/0083* (2013.01); *F21V 13/04* (2013.01); *F21V 15/01* (2013.01); *F21V 23/0442* (2013.01); *F21V 23/06* (2013.01); *F21V 29/89* (2015.01); *F21V 31/00* (2013.01); *F21W 2131/10* (2013.01); *F21Y 2105/10* (2016.08); *F21Y 2113/00* (2013.01); *F21Y 2115/10* (2016.08)

(56) References Cited

U.S. PATENT DOCUMENTS

| | | | | |
|---|---|---|---|---|
| 2005/0111234 | A1* | 5/2005 | Martin | F21S 6/003 362/555 |
| 2008/0285271 | A1* | 11/2008 | Roberge | F21S 8/033 362/235 |
| 2012/0236575 | A1* | 9/2012 | Tsao | F21S 8/02 362/373 |
| 2013/0242574 | A1 | 9/2013 | Guercio et al. | |
| 2014/0199168 | A1* | 7/2014 | Spiro | F04D 29/582 416/5 |
| 2014/0268830 | A1* | 9/2014 | Boyer | F21V 21/14 362/382 |
| 2015/0216017 | A1 | 7/2015 | Pratt et al. | |
| 2015/0226416 | A1 | 8/2015 | Tsao | |
| 2015/0300624 | A1* | 10/2015 | Favarolo | F21V 29/004 362/373 |
| 2015/0345770 | A1 | 12/2015 | Badley | |
| 2016/0363300 | A1* | 12/2016 | Ma | F21V 21/108 |

FOREIGN PATENT DOCUMENTS

| | | |
|---|---|---|
| JP | 2011034760 A1 | 2/2011 |
| WO | 2015128192 A1 | 9/2015 |

OTHER PUBLICATIONS

Written Opinion conducted by the ISA/EP corresponding to International Application No. PCT/US2017/016725, 9 pages.

\* cited by examiner

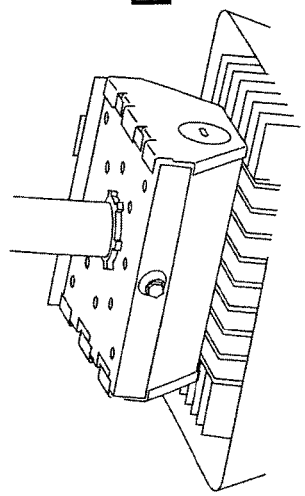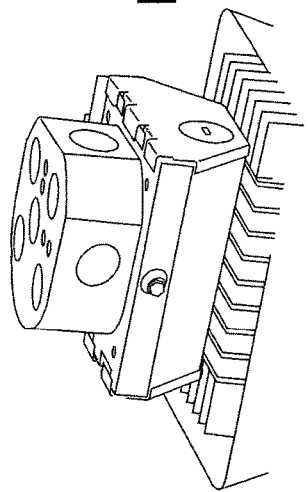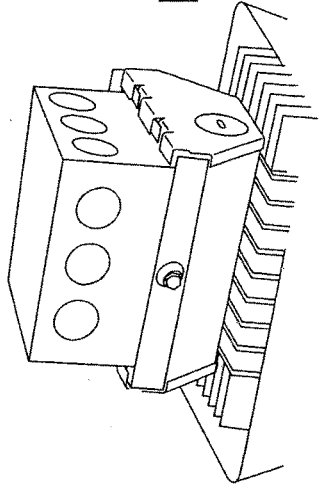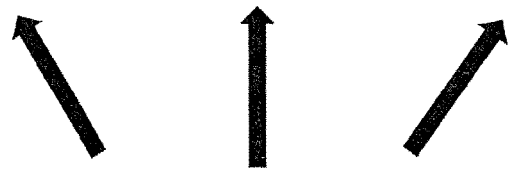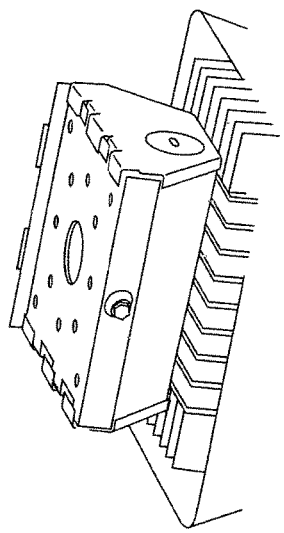

LED LUMINAIRE HAVING ENHANCED THERMAL MANAGEMENT

FIELD

The present invention relates to light emitting diode (LED) luminaires and, in particular, to LED luminaires having architectures for independent thermal management of driver and LED assemblies.

BACKGROUND

LEDs are among the most efficient lighting sources available. LED design and associated luminaire architectures continue to evolve to extract higher efficiencies and greater lighting performance. However, a substantial amount of the power running through an LED is output as heat. For example, LEDs generally convert 25 to 50 percent of the input power to light, with the remaining input power being converted to heat. Accordingly, a main cause of LED performance loss and failure is tied to improper thermal management. Elevated junction temperatures precipitate reductions in recoverable light output and can accelerate chip degeneration. Elevated junction temperatures can also induce undesirable shifts in lighting color. In view of these problems, significant resources have been allocated to the development of heatsinks and other thermal pathways for the efficient removal of heat from the LED assembly. While generally effective, current heatsink designs and thermal pathways have increasingly reached their performance limits and have struggled with addressing thermal requirements of the driver, thereby calling for the development of new thermal management architectures.

SUMMARY

In one aspect, luminaires are described herein enabling independent thermal management of driver and LED assemblies. For example, a luminaire comprises a driver assembly vertically integrated with a LED assembly, the driver assembly comprising a driver heatsink having an interior in which a circuit board assembly is positioned, and the LED assembly comprising an array of LEDs and LED heatsink, wherein a barrier is positioned between the driver heatsink and the LED heatsink separating convective cooling of the driver assembly from convective cooling of the LED assembly. As described further herein, the barrier, in some embodiments, is a shroud. Alternatively, the barrier can be an air envelope separating convective cooling of the driver assembly from convective cooling of the LED assembly.

In some embodiments, the circuit board assembly is coupled to the driver heatsink by a fastener, wherein the fastener also provides a ground connection between the circuit board assembly and the driver heatsink. In other embodiments, the driver assembly can comprise an endplate including one or more structures for coupling the LED assembly. As described further herein, such endplate structures can support the LED assembly in the vertical integration. Moreover, the endplate can be part of an endcap assembly of the driver. The endcap assembly can include a potting gasket positioned between the endplate and driver heatsink. In some embodiments, the potting gasket seals a first end of the driver heatsink for filling the heatsink interior with potting material. In other embodiments, a heatsink, such as the LED heatsink and/or driver heatsink, comprises a moveable interconnect between heatsink fins where the interconnect is located in the interior of the fins.

Importantly, the foregoing luminaire features are not inextricably linked and can be independent of one another. For example, the driver endplate and/or potting gasket can appear in luminaire constructions wherein a shroud and/or fastener are absent. Similarly, the fastener providing a ground connection between the circuit board assembly and driver heatsink can exist independent of the shroud and/or endplate.

These and other embodiments are described further in the following detailed description.

BRIEF DESCRIPTION OF THE DRAWINGS

FIGS. 20(a)-(c) illustrate mounting options for a luminaire described herein according to some embodiments.

DETAILED DESCRIPTION

Figure 1A:
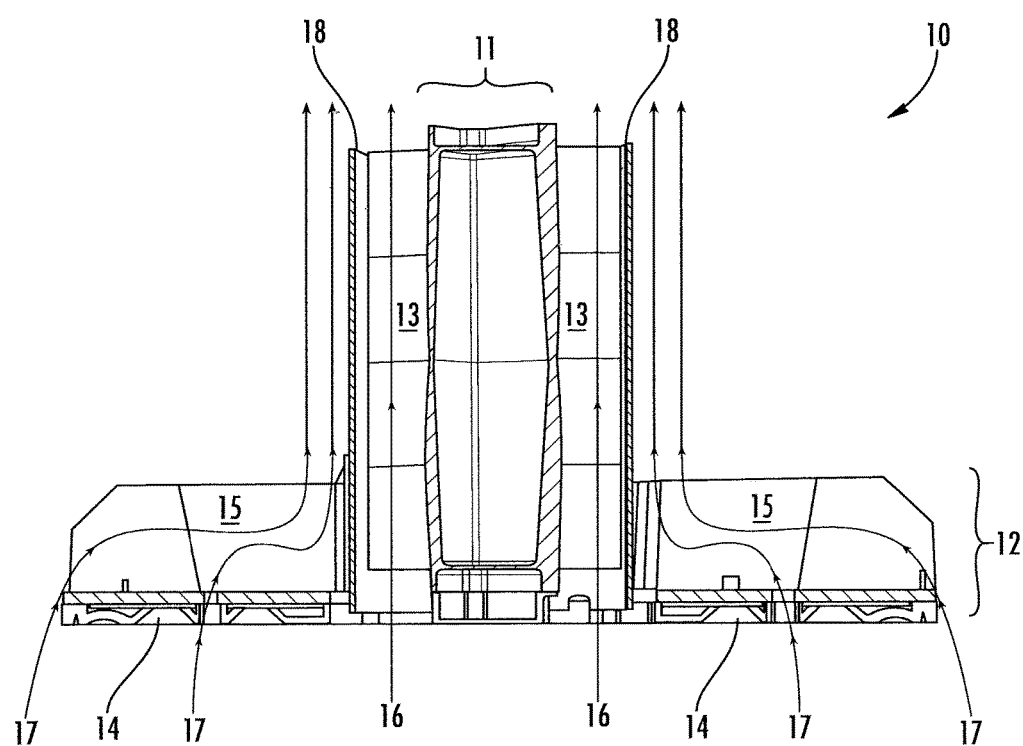
FIG. 1(a) is a cross-sectional view of a luminaire illustrating separation of convective cooling of the driver and LED assemblies by a shroud according to some embodiments.

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 1B:
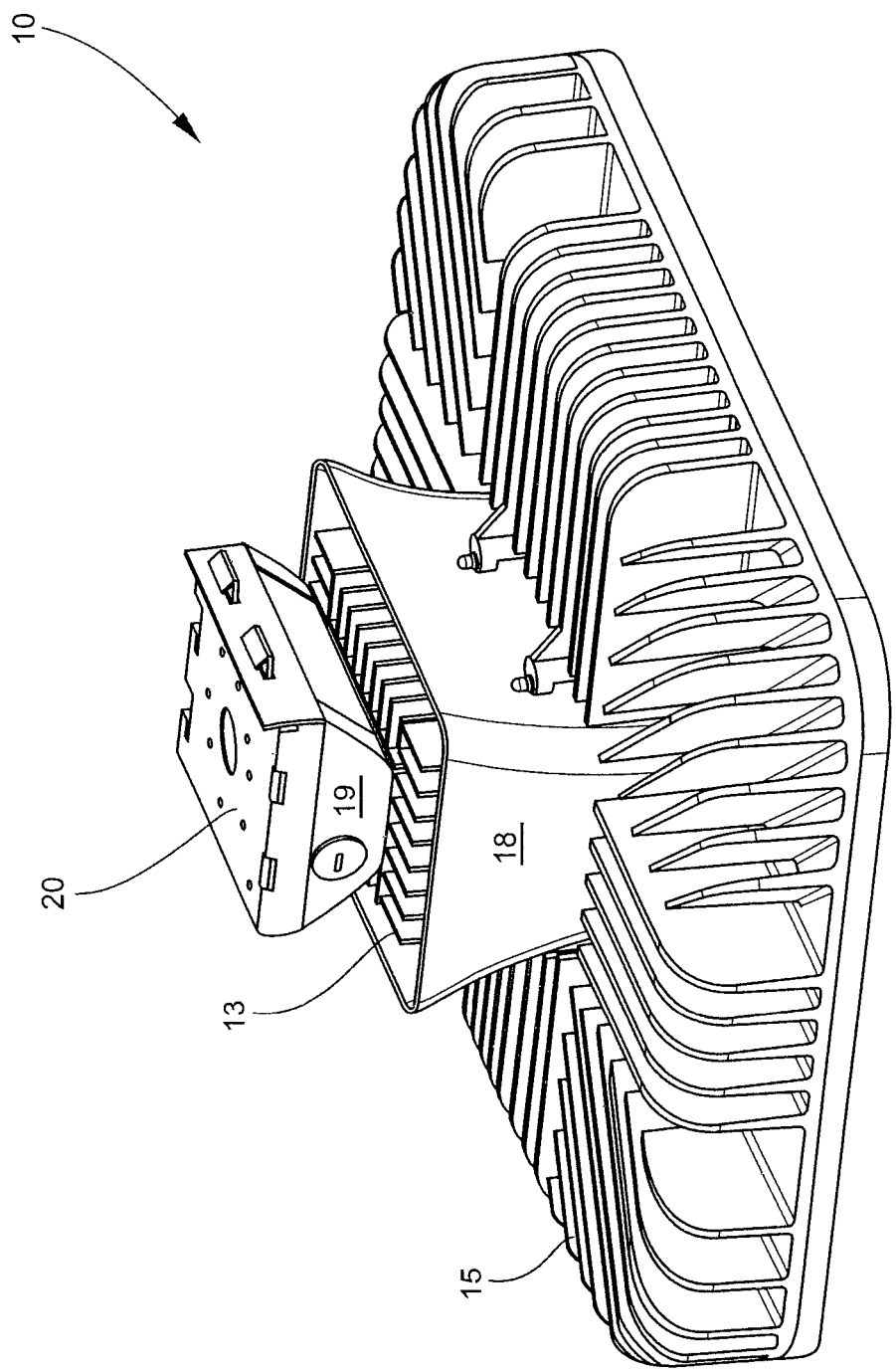
FIG. 1(b) is a perspective view of a luminaire illustrating separation of convective cooling of the driver and LED assemblies by a shroud according to some embodiments.

Referring to the embodiment of FIGS. 1(a)-(b), the luminaire 10 employs architecture separating convective cooling of the driver assembly from convective cooling of the LED assembly. As illustrated in the cross-sectional view of FIG. 1(a), the driver assembly 11 and LED assembly 12 are vertically integrated, wherein the driver assembly 11 includes a heatsink 13, and the LED assembly 12 includes an LED array 14 coupled to the base of a finned heatsink 15. In the embodiment of FIGS. 1(a)-(b), the driver assembly 11 is vertically positioned in a central region of the LED assembly 12. In other embodiments, the driver assembly 11 can be vertically integrated in a position that is offset from a central region of the LED assembly 12. A shroud 18 is positioned between the driver heatsink 13 and LED heatsink 15. The shroud 18 provides separate pathways for convective air currents 16 cooling the driver assembly 11 and convective air currents 17 cooling the LED assembly 12. Such separation of convective air currents can preclude the LED assembly 12 from heating the driver assembly 11 and enable independent convective cooling and thermal management of the driver assembly 11. In some embodiments, the architecture of FIG. 1(a) results in thermal isolation of the driver assembly 11 from the LED assembly 12. In other embodiments, the driver heat sink 13 and LED heatsink 15 can be thermally coupled.

FIG. 1(b) is a perspective view of the luminaire 10 wherein a junction box 19 and mounting plate 20 are further illustrated. In the embodiment of FIG. 1(b), the shroud 18 isolates the driver heatsink 13 from the surrounding LED heatsink 15. As such, the shroud 18 encloses sides of the driver heatsink 13 leaving the bottom and top of the driver heatsink open for passing convective air currents and cooling the driver assembly separate from the LED assembly. In alternative embodiments, the shroud does not completely surround or enclose sides of the driver heatsink, and pathways for separate convective air currents are established along less than all sides of the driver heatsink. The driver assembly, for example, may adopt a position in vertical integration with the LED assembly where the driver is not bordered on all sides by the LED heatsink, such as a position offset from the central region of the LED assembly. In such embodiments, the shroud may not be present along sides of the driver assembly not bordering the LED heatsink. Therefore, pathways for convective air currents can provided along less than all sides of the driver assembly in some embodiments. Additionally, the shroud can have any desired design. In the embodiment of FIG. 1(b), the shroud 18 exhibits smooth surfaces having an outward curvature in the vertical dimension. In other embodiments, the shroud can exhibit different curvature profiles and/or finned or ridged structures on the shroud interior or exterior. In further embodiments, the shroud may employ one or more baffle structures. Such shroud structures may be used to manage convective air flow currents through the luminaire. Specific design and placement of the shroud can be selected according to several considerations including, but not limited to, positioning of the driver assembly relative to the LED heatsink, design of the driver heatsink and/or LED heatsink and desired number and/or geometry of convective air current pathways for cooling the driver assembly independent of the LED assembly.

Figure 2A:
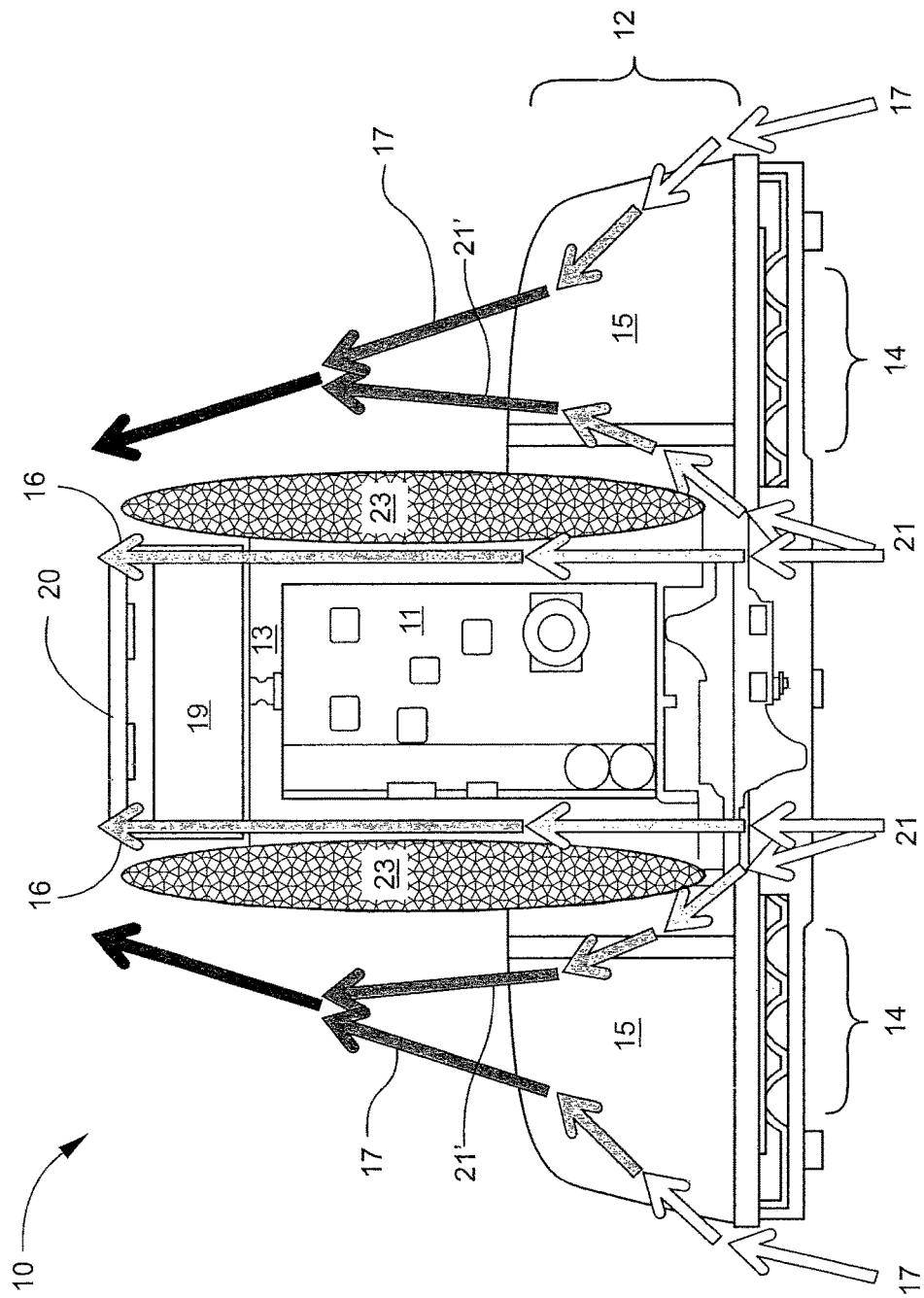
FIG. 2(a) is a cross-sectional view of a luminaire illustrating separation of convective cooling of the driver and LED assemblies by an air envelope according to some embodiments.
Figure 12B:
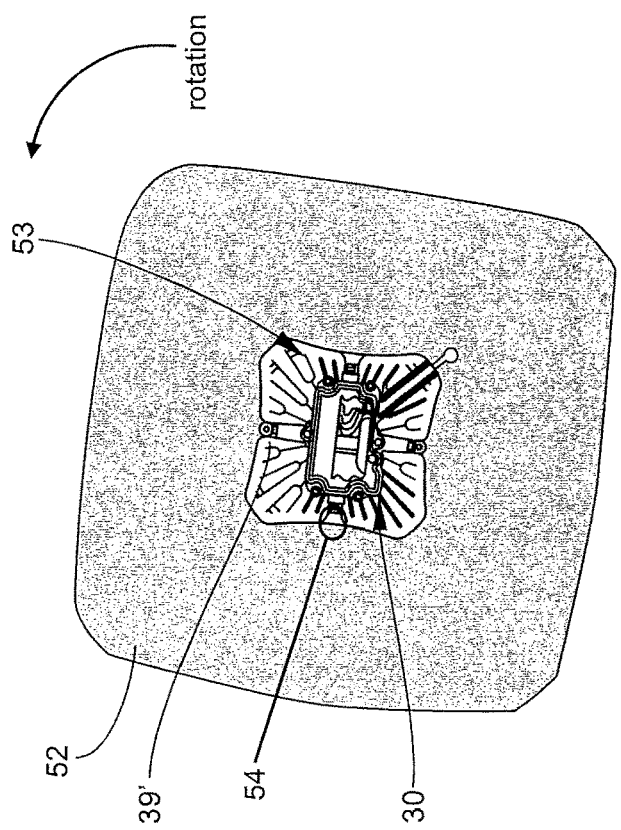
FIGS. 12(a)-12(c) illustrate various views of coupling between a driver assembly and LED heatsink according to some embodiments.
Figure 12A:
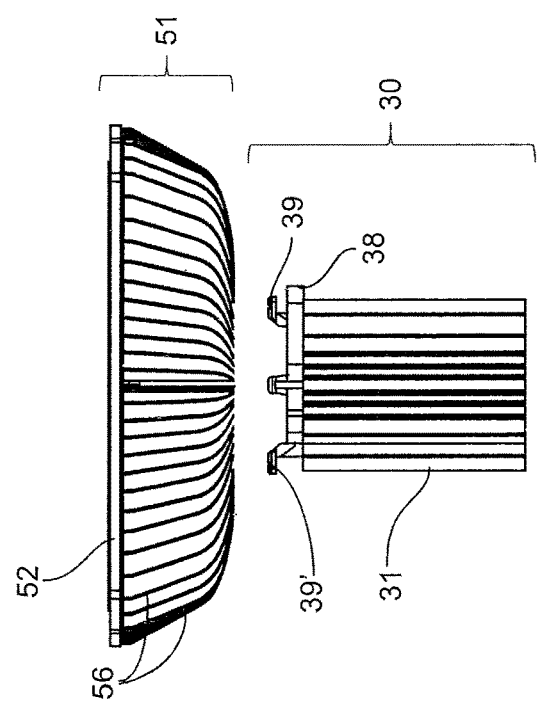
Figure 12C:
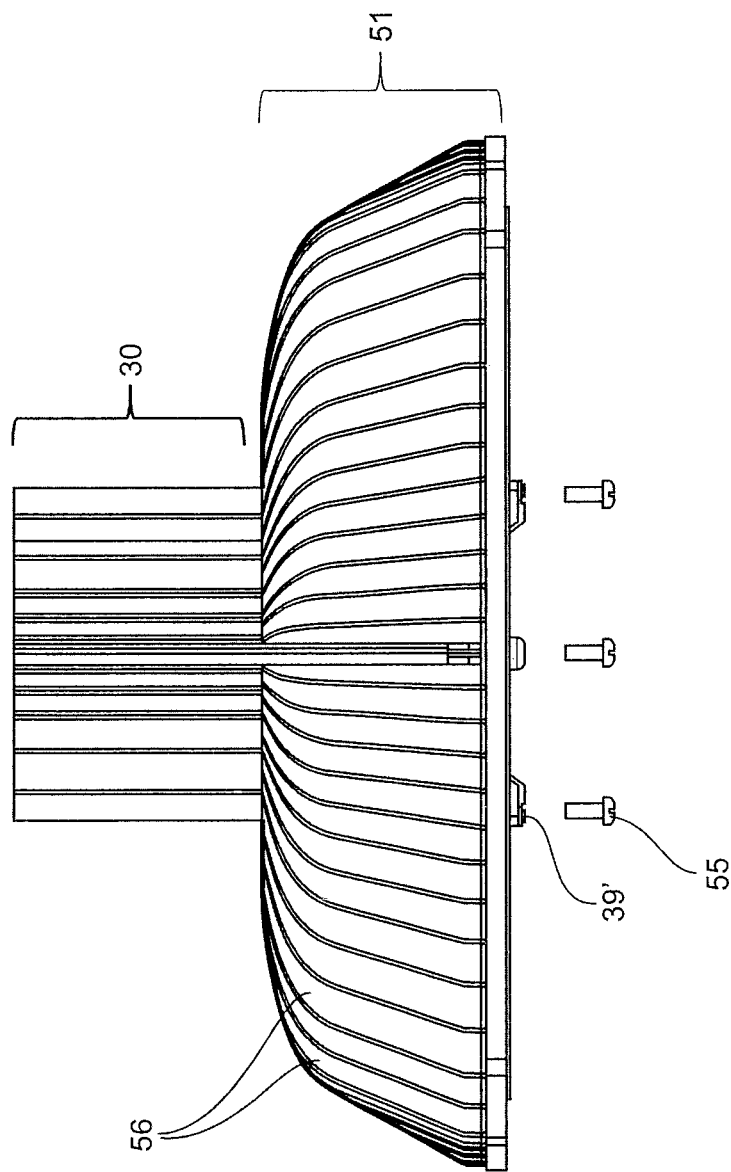

As described herein, the barrier is not required to be a shroud or other solid structure. The barrier, in some embodiments, is an air envelope separating convective cooling of the driver assembly from the convective cooling of the LED assembly. Referring to the cross-sectional view of FIG. 2(a), the luminaire 10 does not employ a shroud between the driver heatsink 13 and LED heatsink 15. In the embodiment of FIG. 2(a), the driver assembly 11 is vertically positioned in a central region of the LED assembly 12. In other embodiments, the driver assembly 11 can be vertically integrated in a position that is offset from a central region of the LED assembly 12. A portion 21' of air flow 21 entering a central aperture of the luminaire 10 is pulled away from the driver assembly 11 by fins of the LED heatsink 15 and contributes to cooling of the LED assembly 14 in conjunction with convective air currents 17. The remaining portion of the air flow 21 provides convective air currents 16 cooling the driver assembly 11. A central aperture of the luminaire 10 is further illustrated and discussed herein in the non-limiting embodiments of FIGS. 12(b), 14(d) and 17. This distribution of convective air currents establishes an air envelope 23 between the driver heatsink 13 and the LED heatsink 15, thereby separating pathways of convective air currents 16 cooling the driver assembly 11 from convective air currents 17, 21' cooling the LED assembly 12. Such separation of convective air currents by the air envelope 23 can preclude the LED assembly 12 from heating the driver assembly 11 and enable independent convective cooling and thermal management of the driver assembly 11. The architecture of FIG. 2(a), in some embodiments, results in thermal isolation of the driver assembly 11 from the LED assembly 12.

When present, the air envelope can provide a barrier or boundary on sides of the driver heatsink and driver assembly. Alternatively, the air envelope does not completely surround or enclose sides of the driver heatsink, and pathways for convective air currents are established along less than all sides of the driver heatsink. The driver assembly, for example, may adopt a position in vertical integration with the LED assembly where the driver assembly is not bordered on all sides of by the LED heatsink, such as a position offset from the central region of the LED assembly. As such, the air envelope may not be present along sides of the driver assembly not bordering the LED heatsink. Therefore, pathways for convective air currents can be provided along less than all sides of the driver assembly in some embodiments.

Figure 2B:
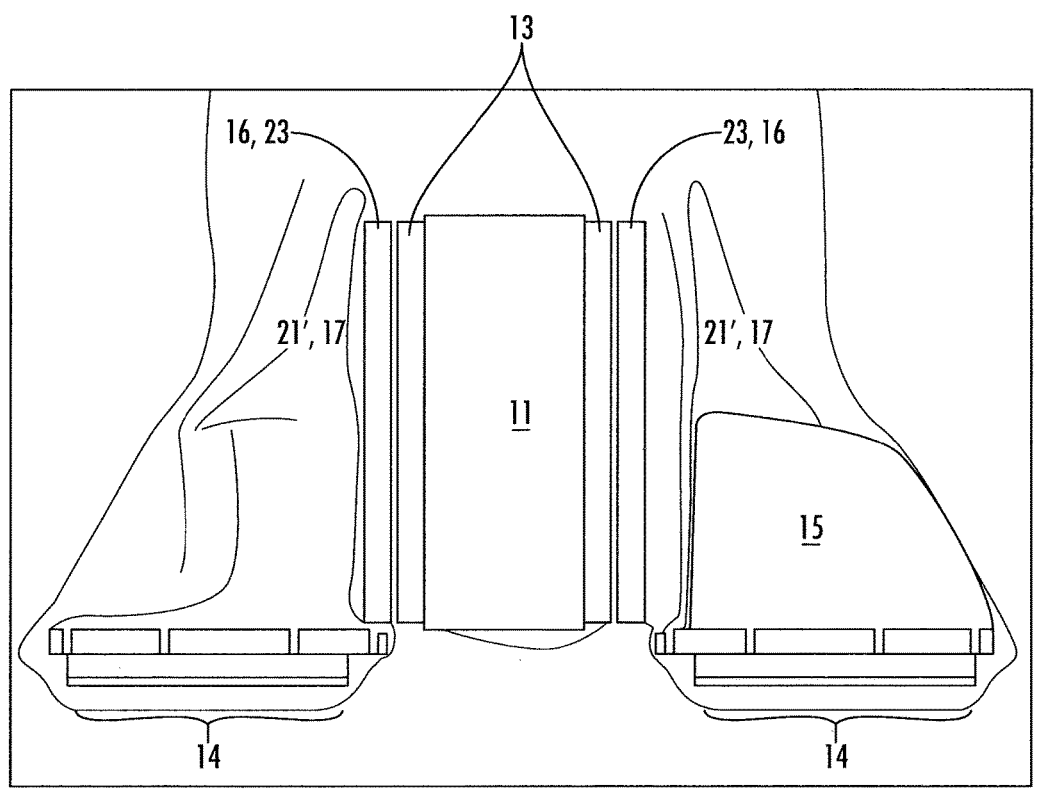
FIG. 2(b) illustrates a cross-sectional fluid temperature profile of the luminaire of FIG. 2(a).

FIG. 2(b) illustrates the air envelope via a cross-sectional fluid temperature profile of the luminaire 10 of FIG. 2(a) according to some embodiments. As illustrated in FIG. 2(b), an envelope 23 of cooler air 16 establishes a forced air boundary or barrier separating convective cooling of the driver assembly 11 from convective cooling of the LED assembly 14. Little to no heated air 17, 21' from the LED assembly 14 contacts the heatsink 13 of the driver assembly 11. Dimensions of the air envelope 23 can be established and controlled by several considerations including, but not limited to, fin height and fin spacing of the LED heatsink 15, height of the driver assembly 11 and/or distance of the LED heatsink 15 fins from the central aperture of the luminaire 10. For example, the ratio of driver assembly height to fin height should be sufficiently low to prevent warm or hot air from the LED heatsink from re-converging on upper portions of the driver assembly, such as portions proximate the junction box. In some embodiments, the ratio of driver assembly height to fin height is less than 1:5. Moreover, fins of the LED heatsink should have sufficient spacing to facilitate pulling air from the central aperture of the luminaire into the LED heatsink for cooling of the LED assembly as illustrated in FIG. 2(a). In some embodiments, the LED heatsink has a minimum fin-to-fin spacing of 0.180". In some embodiments, fin spacing of the LED heatsink is uniform. In other embodiments, fin spacing can be varied according to desired flow characteristics of the LED heatsink. Additionally, altering the distance of the fins from the central aperture of the luminaire can affect size of the air envelope. For example, in some embodiments, increasing the distance of the LED heatsink fins from the central aperture increases the size of the air envelope. One or more fins of the LED heatsink can also have geometry or design for managing dimensions of the air envelope. LED heatsink fins, in some embodiments, have curvature or design for directing convective air currents away from the driver assembly. Such embodiments can further preclude or inhibit re-convergence of warm or hot air from the LED heatsink on the driver assembly and enable higher values for the ratio of driver assembly height to fin height.

Turning now to specific components, FIGS. 3-11 illustrate various aspects of the driver assembly. FIGS. 3(a) and 3(b), for example, provide perspective views of a driver assembly 30 according to some embodiments described herein. The driver assembly 30 includes a heatsink 31 having an interior 32 in which a circuit board assembly 33 is positioned. The heatsink 31 can be formed of any suitable material not inconsistent with the objectives of the present invention. Generally, the heatsink 31 can be formed of a material having a thermal conductivity in the range of 3-300 W/m·K. In some embodiments, the heatsink 31 is fabricated from aluminum or other metal or alloy. For example, the heatsink 31 can be fabricated from aluminum or other metal by extruding aluminum. Alternatively, the heatsink 31 can be formed of a polymeric material or polymeric composite and produced by die-casting or molding techniques.

Figure 3B:
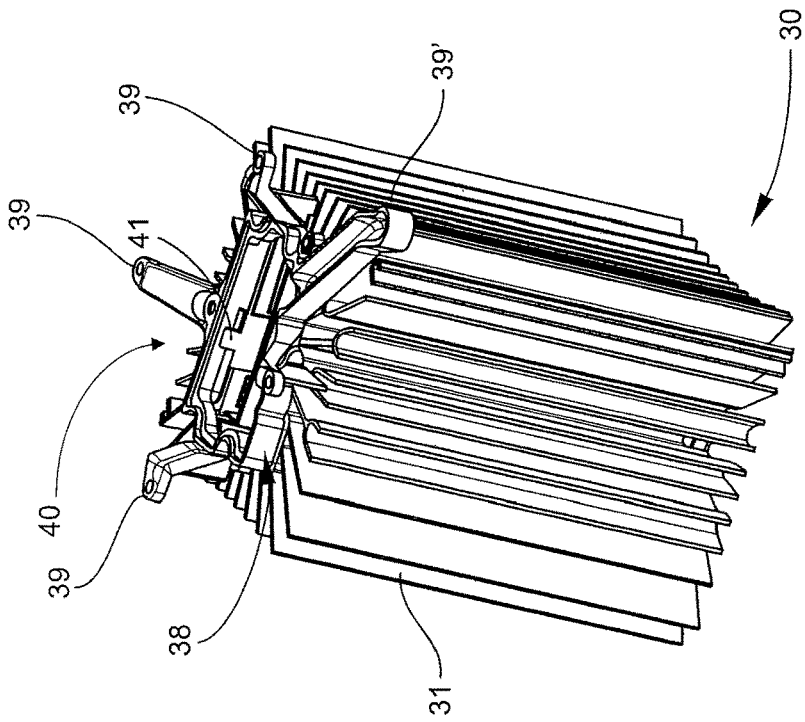
FIGS. 3(a) and 3(b) illustrate perspective views of a driver assembly according to some embodiments.
Figure 3A:
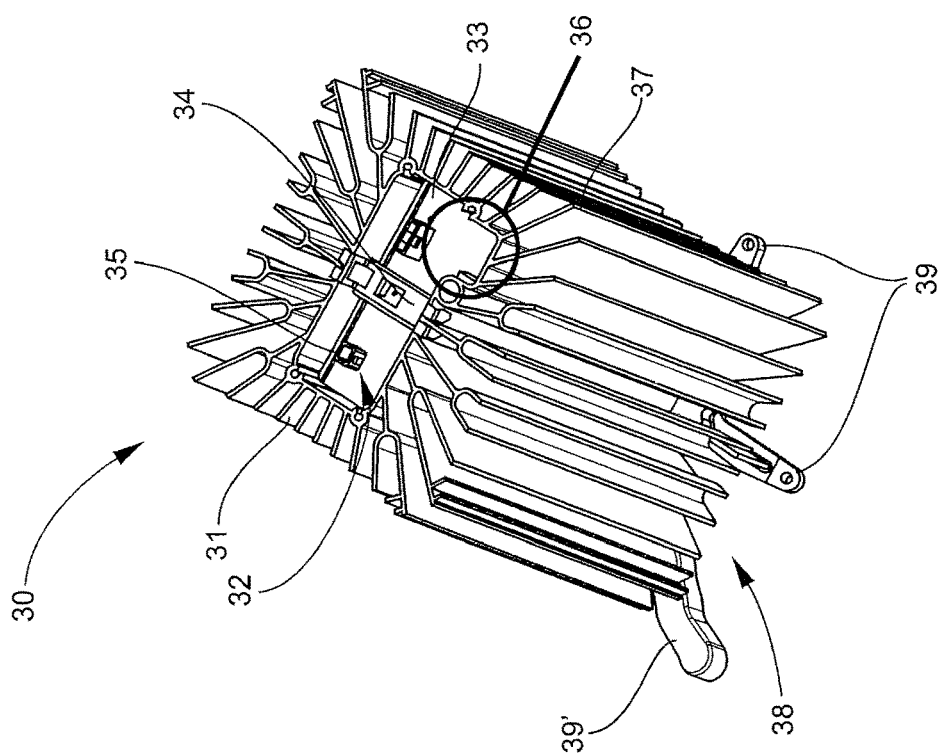

In the embodiment of FIG. 3(a), the circuit board assembly 33 is coupled to the heatsink 31 by a fastener 34. The fastener 34 can normalize positioning of the circuit board assembly 33 in the heatsink interior 32 and provide a ground connection between the circuit board assembly 33 and heatsink 31. Importantly, the fastener 34 can also serve as a ground contact for electrical component(s) connecting the luminaire to a power source. The circuit board assembly 33, for example, can include a terminal 35 for receipt and transfer of a component ground to the fastener 34 through traces on the board assembly 33. In some embodiments, the fastener 34 can serve as both an earth ground and electromagnetic interference (EMI) ground. In serving as a ground contact for multiple components, the fastener 34 can free the luminaire from all ground wires, greatly simplifying luminaire assembly. The fastener 34 can have any design and/or structure for functioning as a ground contact as described herein. In some embodiments, for example, the fastener can be a clip such as a spring clip. The fastener 34 can engage one side or multiple sides of the heatsink 31. In the embodiment of FIG. 3(*a*), the fastener 34 spans a width of the heatsink interior 32, contacting opposing sides of the heatsink 31. Further, the fastener can have any structure(s) facilitating electrical contact with ground traces of the circuit board assembly 33. The fastener 34 can engage the circuit board assembly 33 at one or more points. Multiple points of engagement can permit allocation of multiple ground traces on the circuit board assembly 33 for effective grounding of the circuit board assembly 33 and other electrical components connected to the luminaire.

The heatsink 31 illustrated in FIG. 3(*a*) additionally includes a recess 36 for housing one or more capacitors (not shown) of the circuit board assembly 33. The recess 36 can have dimension to accommodate the profile of larger capacitors. Moreover, the recess 36 can provide enhanced cooling of the capacitors via dedicated heat dissipation structures. For example, in the embodiment of FIG. 3(*a*), several finned structures 37 are assigned to solely cooling the recess, thereby providing enhanced cooling of the capacitors received by the recess 36. The finned structures 37 can be single fins, branched fins and/or curved fins. This is in contrast to prior architectures where capacitors are restricted to low profile arrangements for accommodation within square or rectangular housings and heat dissipation structures are generally shared among all components of the circuit board assembly.

The driver assembly of FIG. 3(*a*) further comprises an endplate 38 including one or more structures 39 for coupling the LED assembly. In the present embodiment, the structures 39 are arms or projections for coupling the LED assembly. As described further herein, the structures 39 can support the LED assembly when integrated with the driver assembly 30 in a vertical format. In other embodiments, structure(s) of the endplate for engaging the LED assembly may include one or more collar or ring assemblies. Suitable endplate structures can also include recesses or slots for receiving projections of the LED assembly. In further embodiments, endplate structures can include fasteners such as clip(s) or thread(s) for engaging the LED assembly. Moreover, one structure 39' can serve as a wire way for electrical connection between the circuit board assembly 33 and LED array. As such, the structures 39 can serve multiple purposes, facilitating coupling of mechanical and electrical components of the driver assembly and LED assembly.

FIG. 3(*b*) is a perspective view of the driver assembly 30 of FIG. 3(*a*) wherein the driver assembly 30 has been inverted to further illustrate the endplate 38. The endplate 38, in some embodiments, is part of an endcap assembly enclosing a first end 40 of the heatsink interior 32. A potting gasket (not shown) can be positioned between the endplate 38 and heatsink 31. The potting gasket includes an aperture for passing one or more electrical connections of the circuit board assembly 33. In the embodiment of FIG. 3(*b*), a card edge 41 of the circuit board assembly 33 extends though the aperture in the potting gasket for electrical connection with the LED assembly. Use of a card edge can free the driver assembly of wire leads, thereby facilitating assembly of the luminaire.

Figure 4:
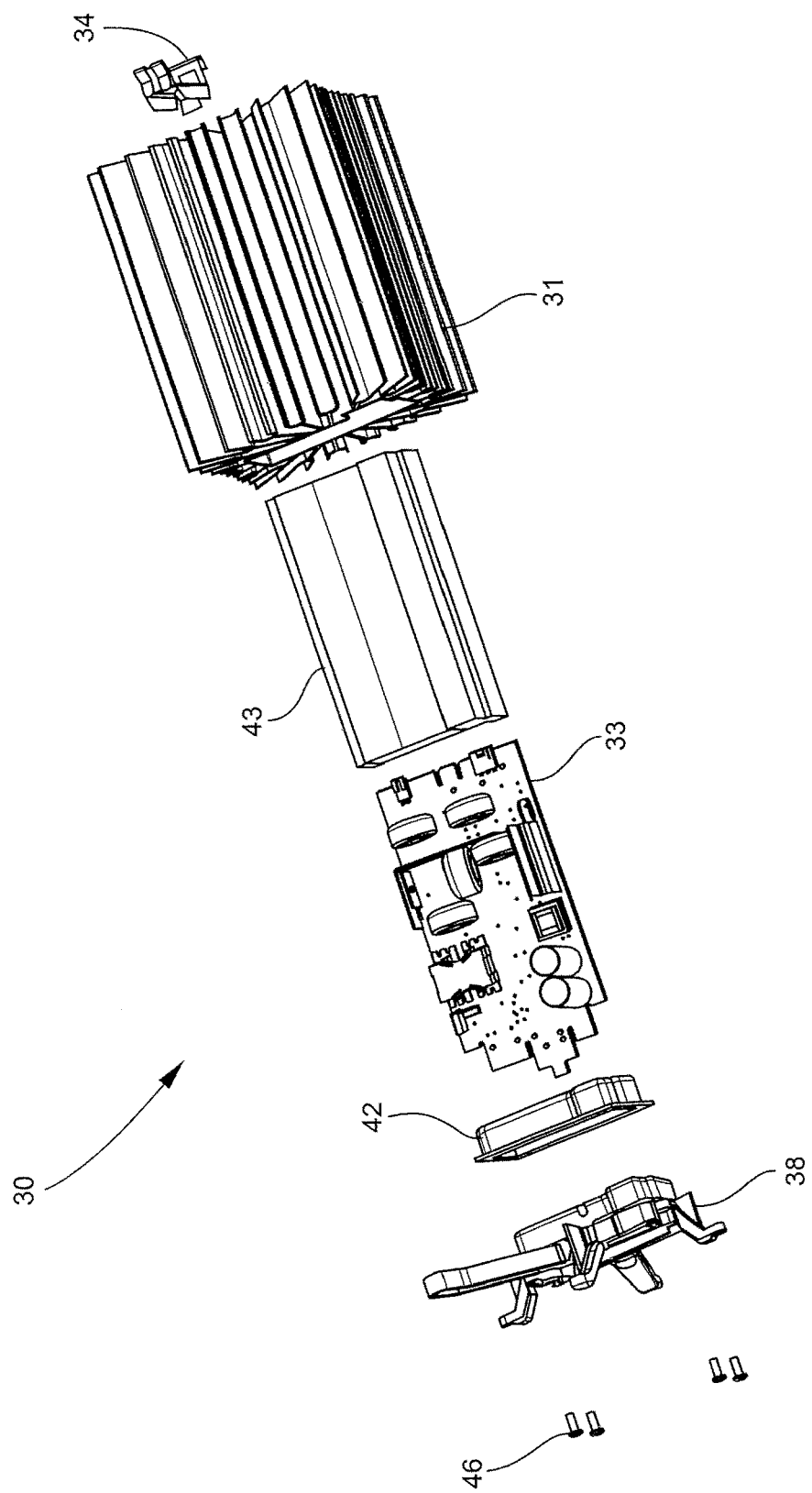
FIG. 4 is an exploded view of a driver assembly according to some embodiments.
Figure 5:
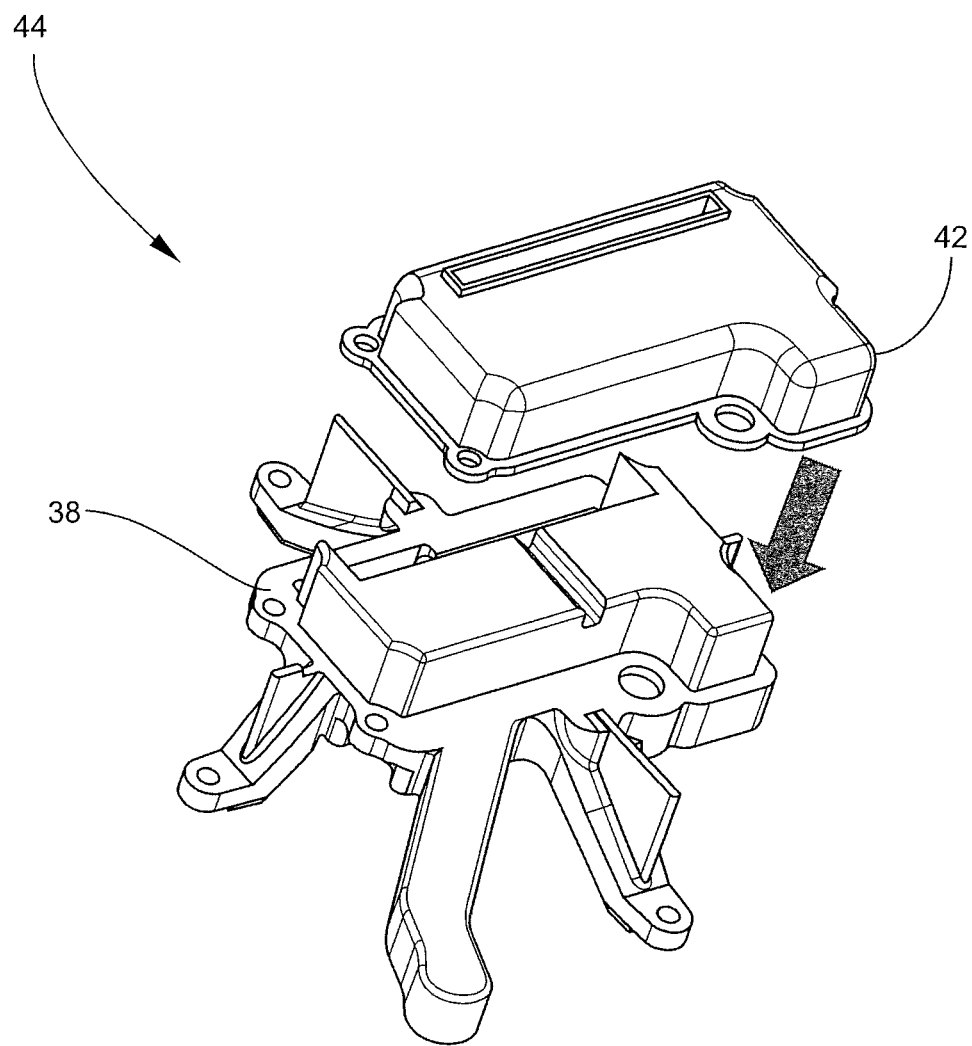
FIG. 5 is an exploded view of an endcap assembly according to some embodiments.
Figure 6:
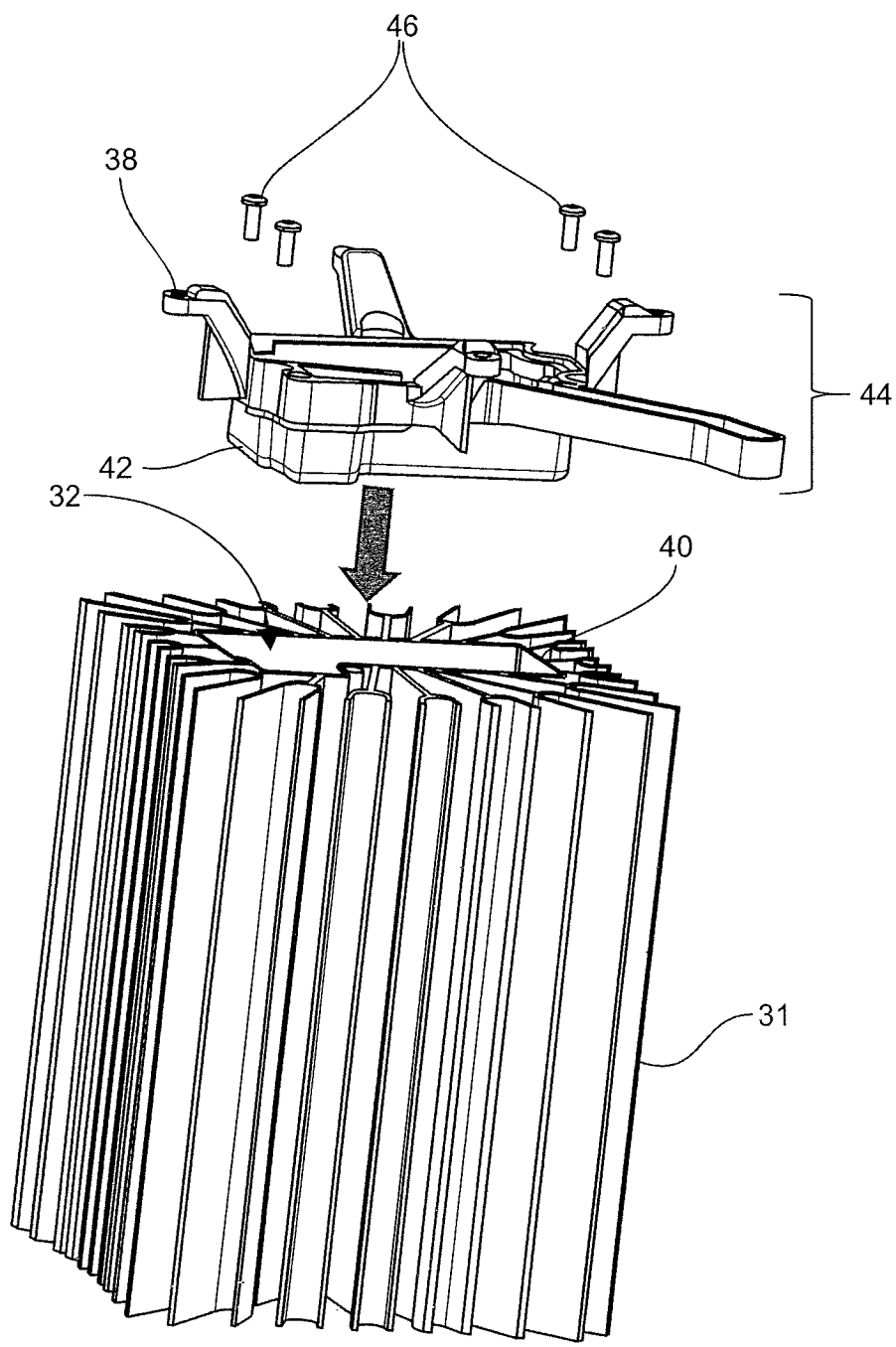
FIG. 6 illustrates coupling of an endcap assembly and driver assembly according to some embodiments.
Figure 7:
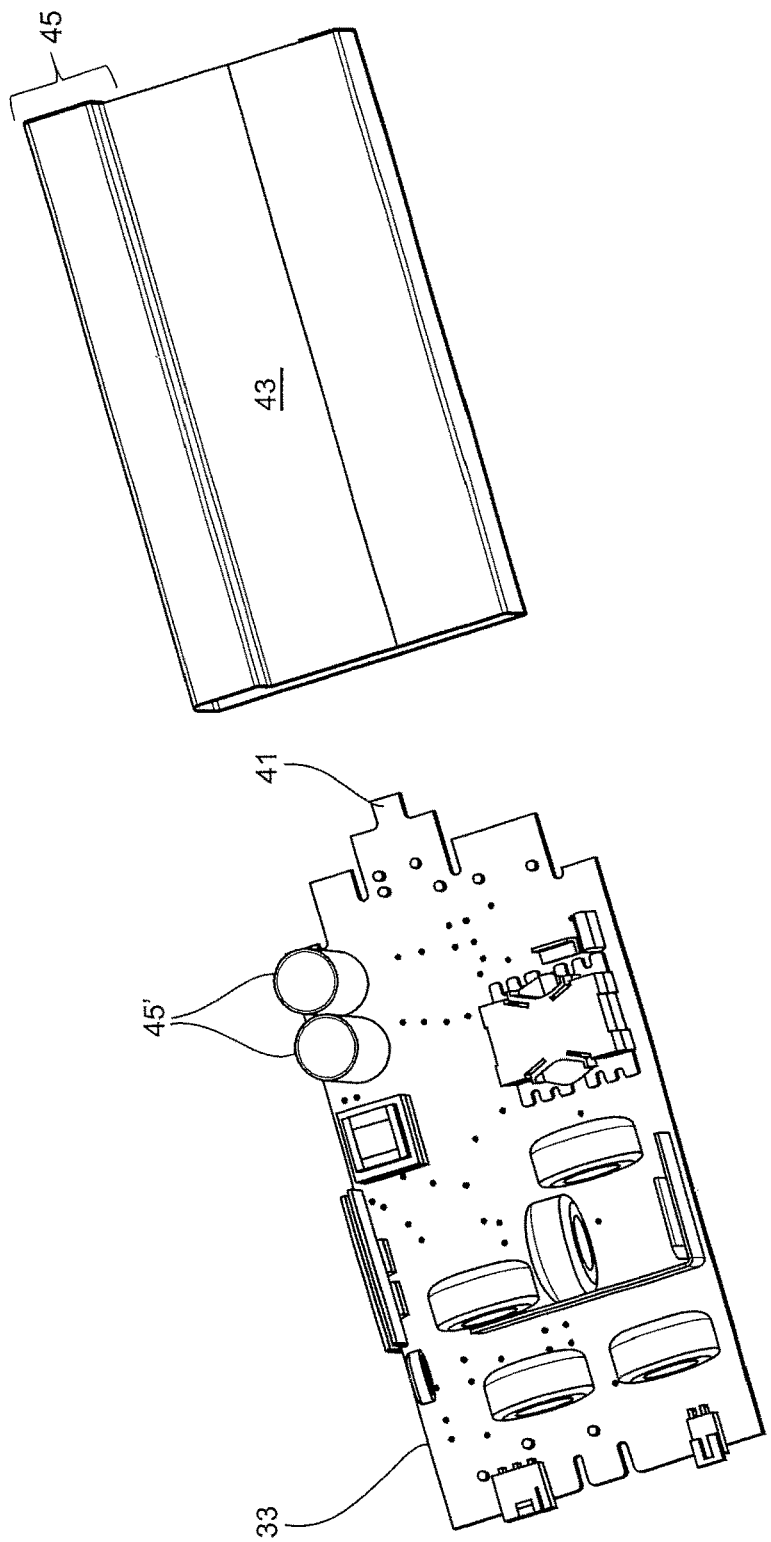
FIG. 7 illustrates a circuit board assembly and associated sleeve according to some embodiments.
Figure 8:
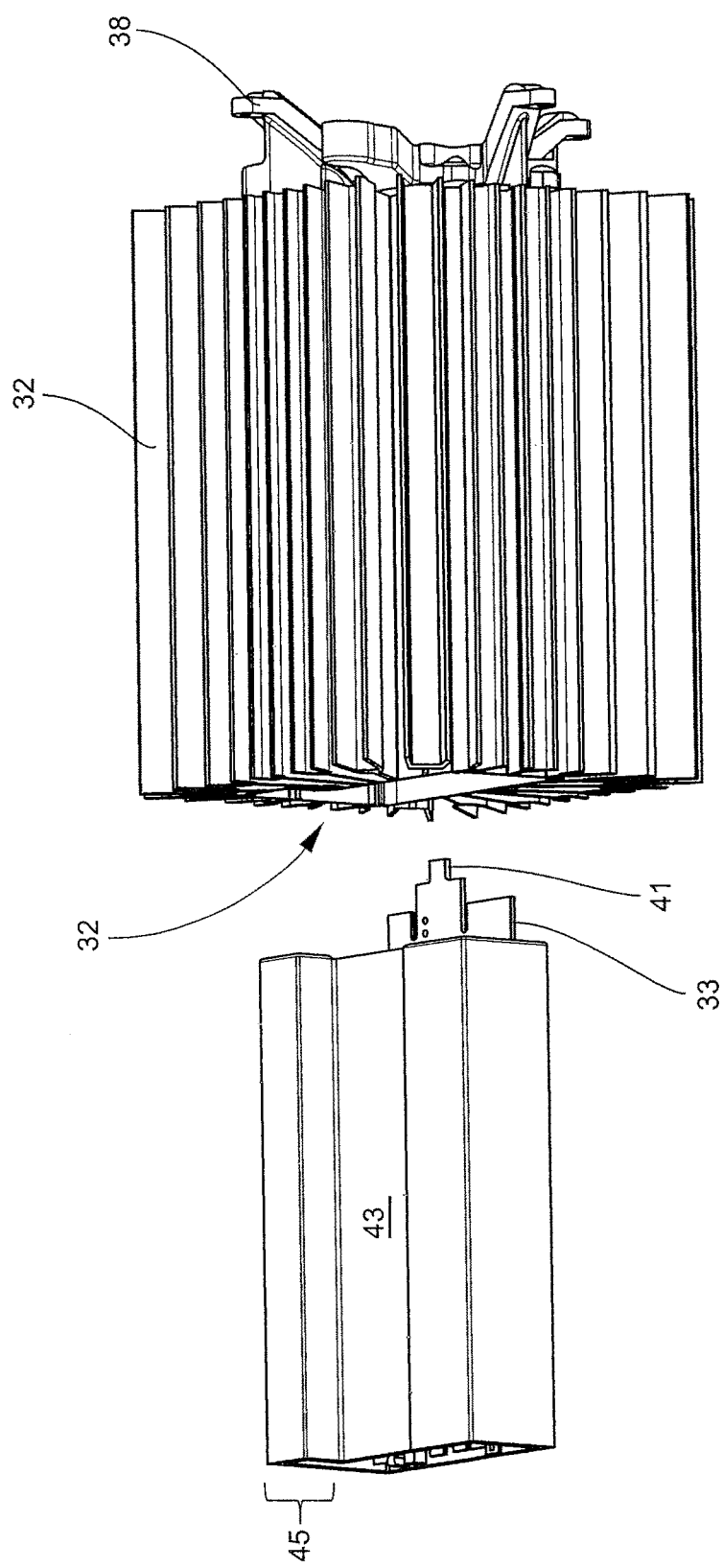
FIG. 8 illustrates insertion of the circuit board assembly and sleeve of FIG. 7 into a driver heatsink interior according to some embodiments.

FIGS. 4-11 illustrate components and fabrication of the driver assembly 30 of FIGS. 3(*a*) and 3(*b*). FIG. 4 is an exploded view of the driver assembly 30 detailing the component parts including the endplate 38, potting gasket 42, circuit board assembly 33, circuit board dielectric sleeve 43, heatsink 31 and ground fastener 34. With reference to FIG. 5, the potting gasket 42 is placed on the endplate 38 to provide the endcap assembly 44, and the endcap assembly 44 is coupled a first end 40 of the driver heatsink 31 via screws or pins 46 as illustrated in FIG. 6. The potting gasket 42 encloses the heatsink interior 32 at the first end 40. The circuit board assembly 33 can be positioned into sleeve 43 prior to being inserted into the heatsink interior 32 as detailed in FIGS. 7 and 8. The sleeve 43 includes a recess 45 for receiving capacitors 45' of the circuit board assembly 33. The recess 45 can have dimensions for sliding into the recess 36 of the heatsink 31. The sleeve 43 can be formed of electrically insulating material for electrical isolation and protection of the circuit board assembly 33. For example, the sleeve 43 can be formed of thermoplastic, such as polypropylene or polyethylene, or preformed insulating paper. In some embodiments, the sleeve 43 can permit a reduction in the amount of potting material added to the heatsink interior 32 and be sufficiently thin for efficient heat transfer to the heatsink 13. In some embodiments, the sleeve 43 is optional. In further embodiments, the sleeve 43 can be formed of a thermally conductive material, facilitating thermal coupling with the heatsink 31 and the dissipation of heat from the circuit board assembly.

Figure 9:
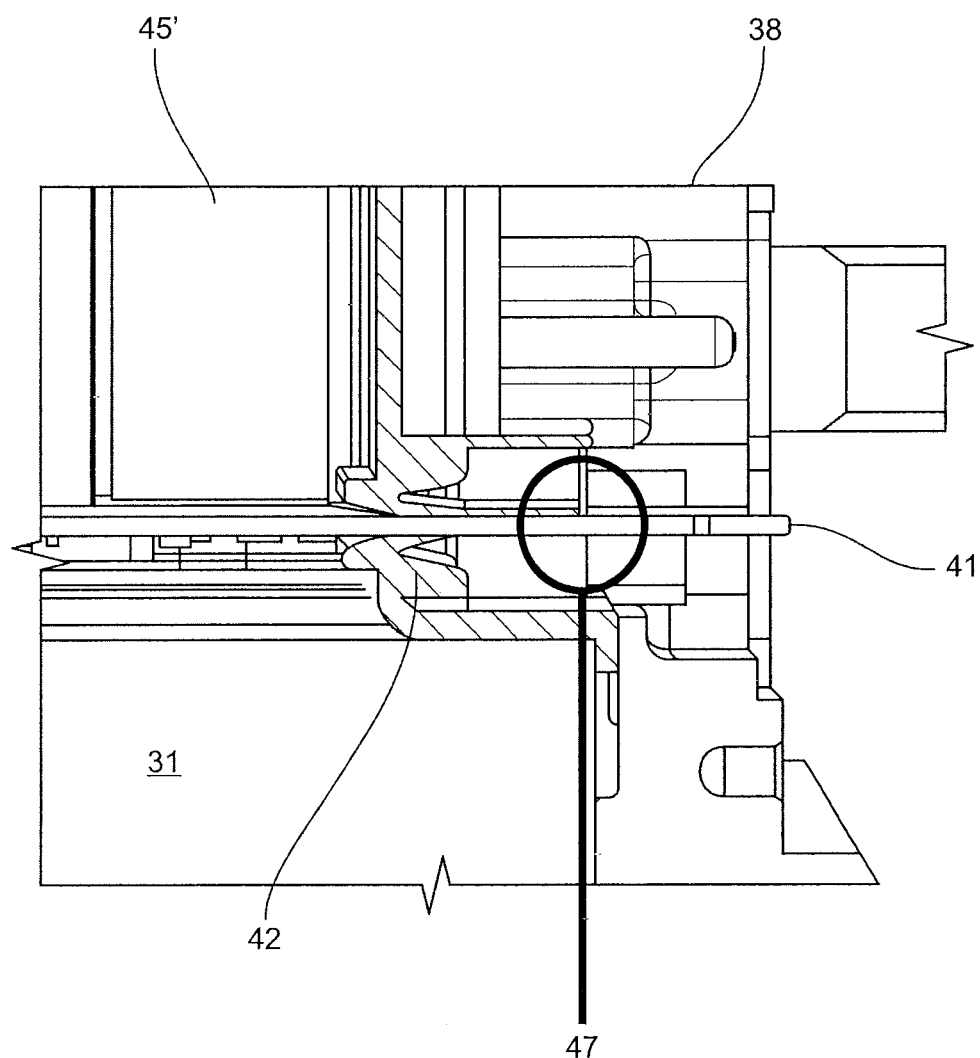
FIG. 9 details a card edge of a circuit board assembly passing through an aperture in a potting gasket according to some embodiments.
Figure 10A:
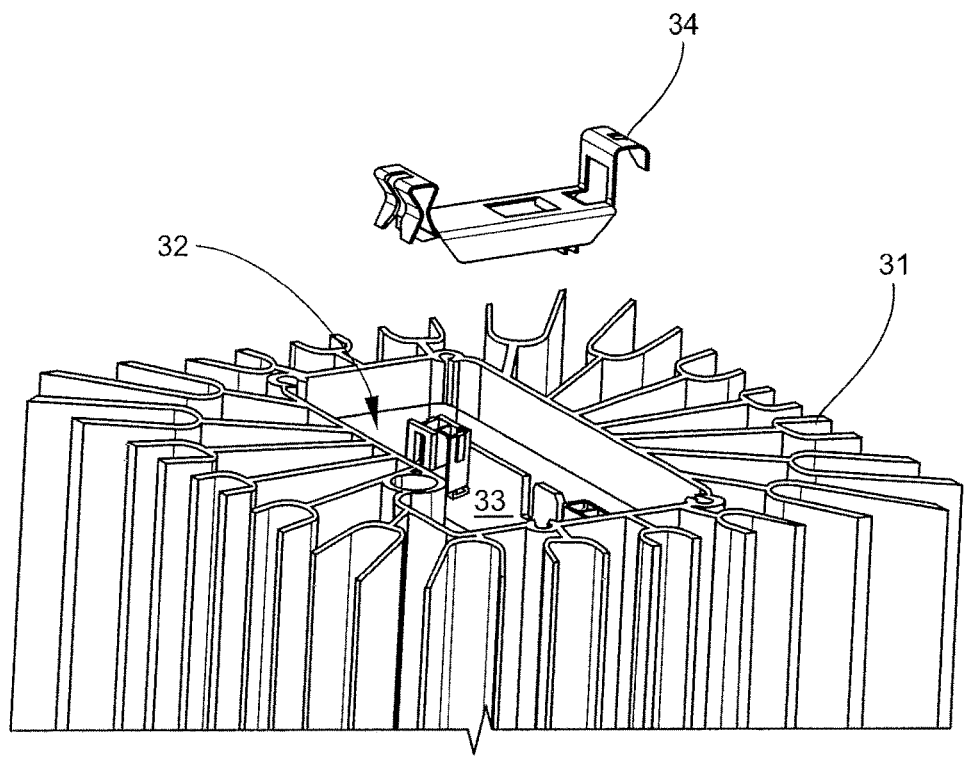
FIGS. 10(a) and 10(b) are perspective view of a ground fastener coupling the circuit board assembly to the driver heatsink according to some embodiments.
Figure 10B:
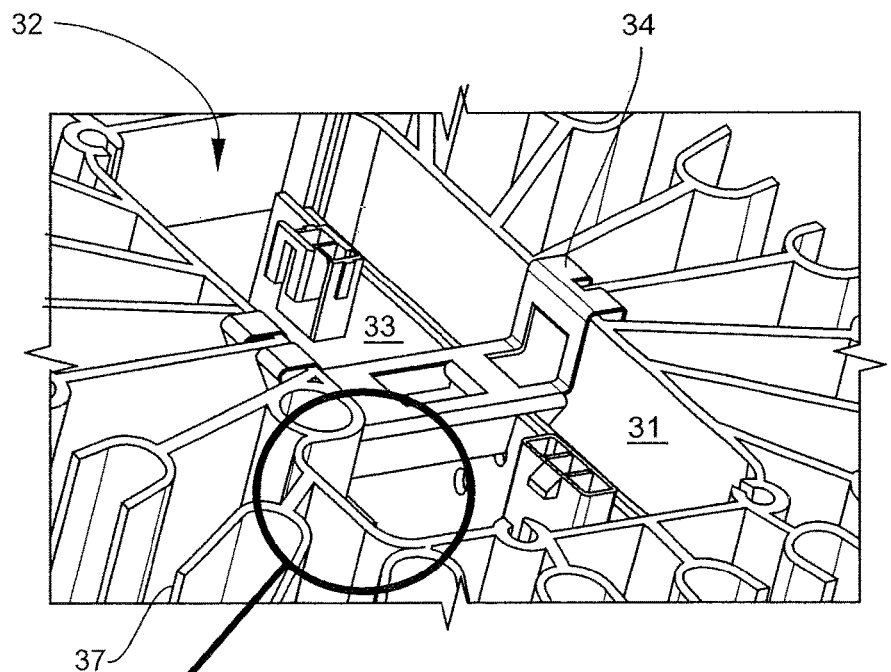

The circuit board assembly 33 includes a card edge 41 for electrical connection with the LED assembly. The card edge can eliminate the need for wires and facilitates assembly. In some embodiments, wires or other electrical connections can be used instead of the card connector. When the circuit board assembly 33 is positioned in the heatsink interior 32, the card edge 41 extends through an aperture 47 in the potting gasket 42 as illustrated in FIG. 9 enabling electrical connection to the LED assembly. Referring now to FIGS. 10(*a*) and 10(*b*), the ground fastener 34 couples the circuit board assembly 33 to the heatsink 31, thereby securing the circuit board assembly 33 at the desired location of the interior 32. FIG. 10(*b*) provides a closer view of the recess 36 in the heatsink 31 for receiving capacitors 45' of the circuit board assembly 33. As discussed herein, the recess 36 includes several finned structures 37 assigned solely to cooling the recess 36, thereby providing enhanced cooling of the capacitors received by the recess 36.

Figure 11:
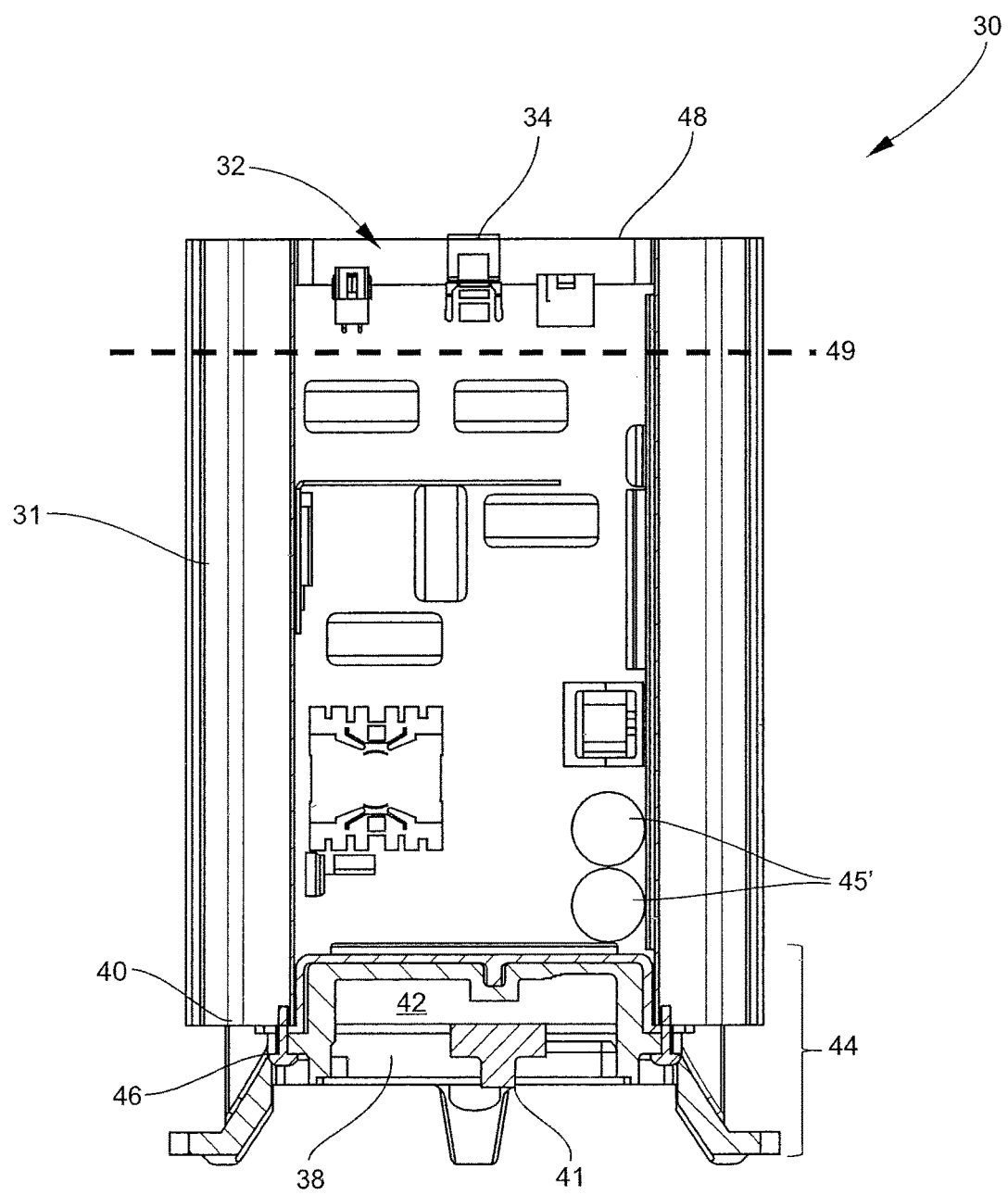
FIG. 11 is a cross-sectional view of the driver assembly constructed according to FIGS. 4-10 herein.

FIG. 11 illustrates a cross-sectional view of the driver assembly 30. In the embodiment of FIG. 11, the endcap assembly 44 seals the heatsink interior 32 at the first end 40. Sealing of the first end 40 enables the heatsink interior 32 to serve as a bucket for receiving potting material. Advantageously, the potting material can be added to the heatsink interior 32 via the open second end 48 of the heatsink 31. Potting material can generally be added to the fill level 49 delineated in FIG. 11. Potting material, in some embodiments, can enhance the ingress protection rating of the driver assembly 30 by providing a waterproof barrier protecting the circuit board assembly 33 and other electrical components. Potting material can additionally assist in thermal management of the driver by transferring heat generated by the circuit board assembly 33 to the heatsink 31. Potting material can comprise a thermoset or thermoplastic material and is generally selected from the group consisting of epoxy resin, polyurethane resin, silicon resin and polyester systems.

Capacitors 45' of the circuit board assembly 33 are also illustrated in the embodiment of FIG. 11. Notably, the capacitors 45' are positioned proximate the endcap assembly 44 and base of the driver 30 where the coolest air contacting the driver heatsink 31 resides. This positioning coupled with the recess 36 and dedicated finned structures 37 illustrated in FIG. 10 provide enhanced cooling of the capacitors 45'.

In further embodiments of a driver assembly described herein, it is contemplated that the heatsink 31 can be replaced with a general housing for the circuit board assembly 33. In such embodiments, the general housing is not required to function as a heatsink for driver cooling. However, the endplate 38 and/or endcap assembly 44 can be employed with the general housing for coupling the LED assembly and/or filling the housing with potting material as described herein. Further, the ground fastener 34 can also be used with general housing. Therefore, a driver assembly not subject to strict thermal management can also realize the technical advantages provided by the endplate 38 and/or endcap assembly 44 as well as the ground fastener 34.

Any of the embodiments disclosed herein may include power or driver circuitry having a buck regulator, a boost regulator, a buck-boost regulator, a fly-back converter, a SEPIC power supply or the like and/or multiple stage power converter employing the like, and may comprise a driver circuit as disclosed in U.S. patent application Ser. No. 14/291,829, filed May 30, 2014, entitled "High Efficiency Driver Circuit with Fast Response" by Hu et al. or U.S. patent application Ser. No. 14/292,001, filed May 30, 2014, entitled "SEPIC Driver Circuit with Low Input Current Ripple" by Hu et al. incorporated by reference herein. The circuit may further be used with light control circuitry that controls color temperature of any of the embodiments disclosed herein, such as disclosed in U.S. patent application Ser. No. 14/292,286, filed May 30, 2014, entitled "Lighting Fixture Providing Variable CCT" by Pope et al. incorporated by reference herein. Additionally, any of the embodiments described herein can include driver circuitry disclosed in U.S. patent application Ser. No. 15/018,375 titled Solid State Light Fixtures Having Ultra-Low Dimming Capabilities and Related Driver Circuits and Methods, filed concurrently herewith on Feb. 8, 2016 and assigned to the same assignee as the present application, the entirety of this application being incorporated herein by reference.

FIGS. 12 to 19 illustrate assembly of a luminaire according to some embodiments described herein. In the elevational view of FIG. 12(a), the LED heatsink 51 is coupled to the driver assembly 30 by engagement with structures 39 of the endplate 38. The structures 39 have lateral projections 39' for engaging the base 52 of the LED heatsink 51. As illustrated in FIG. 12(b), the base 52 of the LED heatsink 50 includes a central aperture 53 and elements 54. The central aperture 53 and the driver assembly 30 are aligned, and the base 52 is rotated to engage elements 54 with the lateral projections 39'. The elements 54 and lateral projections 39' can include holes in for receiving fasteners such as screws or pins 55 as provided in FIG. 12(c). Importantly, the lateral projections 39' can continue to support the LED heatsink 51 in the event of loss of the screws or pins 55. In some embodiments, for example, the lateral projections 39' and elements 54 have a nested arrangement. In embodiments employing an air envelope, the ratio of driver assembly 30 height to fin 56 height can be sufficiently low to prevent warm or hot air from the LED heatsink from re-converging on upper portions of the driver assembly.

The LED heatsink 51 detailed in FIGS. 12(a)-(f) comprises a base 52 having a central aperture 53 for passing convective air currents to the driver heatsink 31. Finned structures 56 are positioned around the central aperture 53 creating an interior of the LED heatsink 51 in which the driver assembly 30 is partially positioned when coupled to the base 52. This arrangement is also illustrated in FIG. 2 herein. The finned structures 56 can have any desired design including single fins, branched fins, curved fins and combinations thereof. The finned structures 56 and base 52 of the LED heatsink can be formed of any suitable thermally conductive material. In some embodiments, the finned structures 56 and base 52 are formed of a material having thermal conductivity of 3-300 W/m·K. In some embodiments, the finned structures 56 and base 52 are fabricated from aluminum, steel sheet metal or other metal/alloy. For example, the finned structures and base 52 can be fabricated from aluminum or other metal by die-casting. In some embodiments, the finned structures 56 are fabricated independent of the base 52 and subsequently coupled to the base 52 by one or more techniques including soldering or bonding by adhesive. Such embodiments provide significant design freedom regarding composition and density of the finned structures 56. In some embodiments, the finned structures 56 and base 52 are formed of the same material. In other embodiments, the finned structures 56 and base 52 are formed of differing materials. For example, the finned structures 56 can be an extruded polymeric material or aluminum alloy and the base 52 a cast metal. Design and structure of the LED heatsink 51 can be governed by several considerations, including cooling requirements for the LED array and cost factors.

Figure 12D:
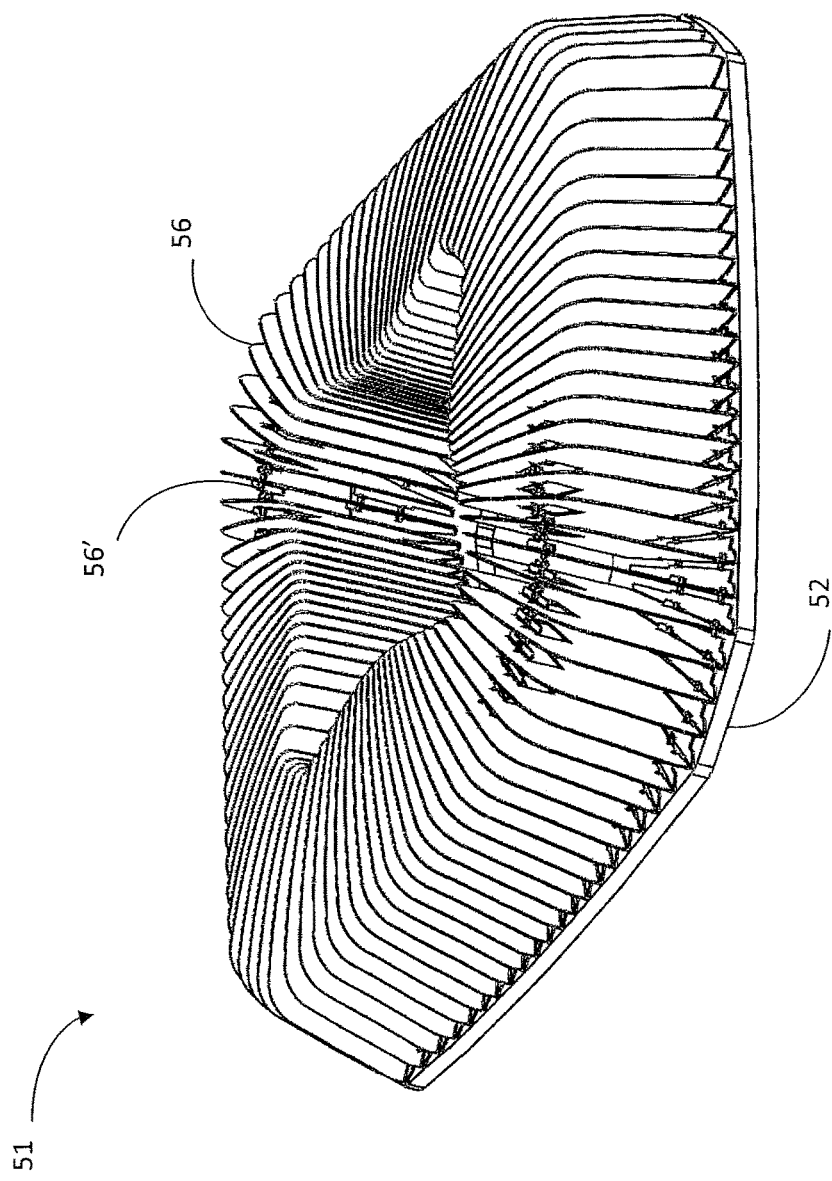
FIGS. 12(d)-12(f) illustrate various views of an interior interconnect between finned structures of a LED heatsink according to some embodiments.
Figure 12E:
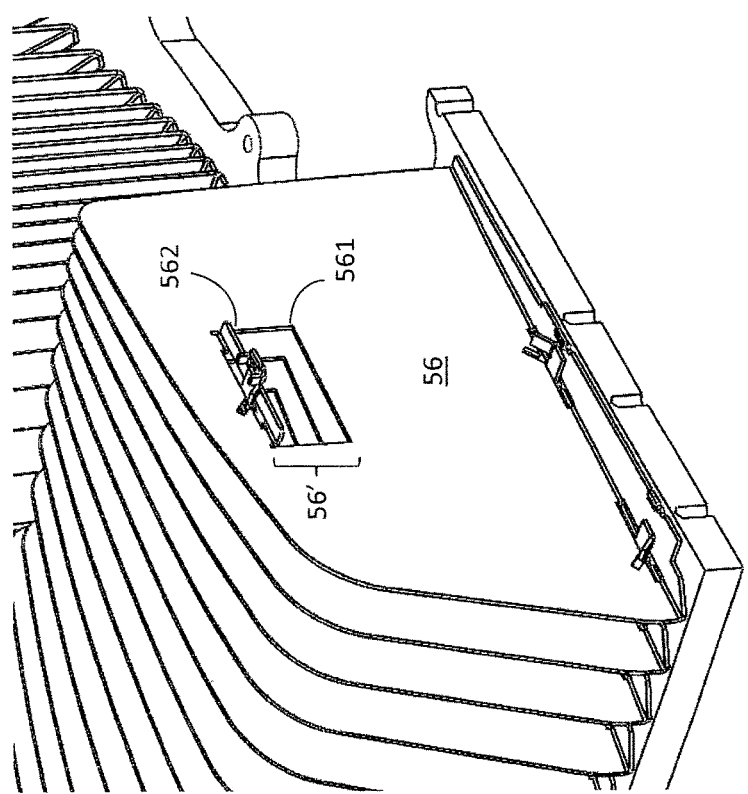
Figure 12F:
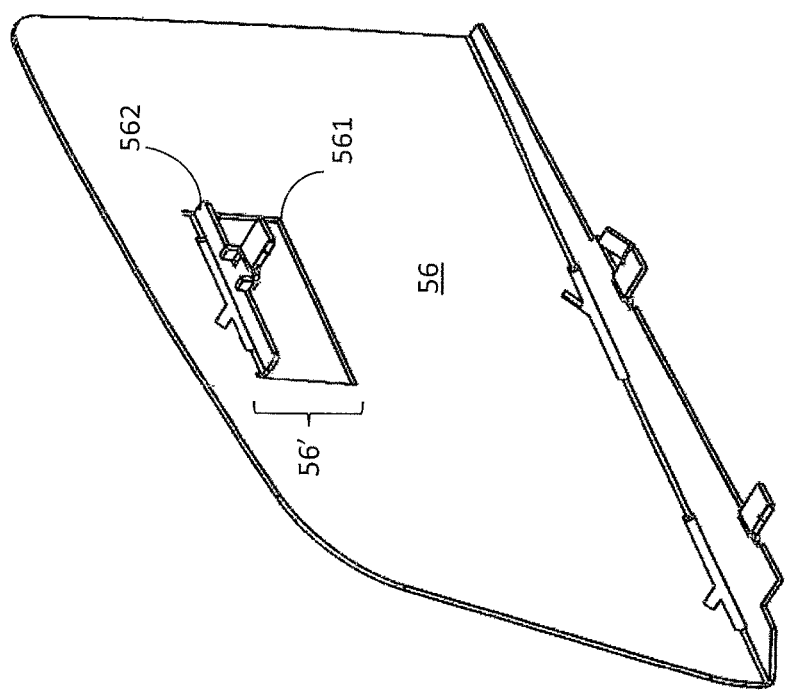

In the embodiment illustrated in FIG. 12(d), the LED heatsink 51 comprises moveable interconnects 56' between the finned structures 56. The moveable interconnects 56' are located in the interior of the finned structures 56 and can provide the finned structures 56 accordion-like functionality for simplifying assembly of the LED heatsink 51 while ensuring the desired spacing of the finned structures 56 is maintained. For example, during assembly of the LED heatsink 51, the finned structures 56 can spread apart from a compressed configuration via the moveable interconnects 56'. The moveable interconnects 56' can serve as stops for the finned structures 56 providing the desired fin 56 spacing. In some embodiments, the moveable interconnects 56' can lock once the desired spacing of the finned structures 56 has been achieved. In this way, several segments of the finned structures 56' can be easily arranged on the base 52, thereby precluding the requirement for individual placement of each finned structure 56 in a serial manner FIG. 12(e) provides a cut-away view of the finned structures 56 further illustrating components of the moveable interconnect 56' according to some embodiments. As illustrated in FIG. 12(e), the interconnect 56' is located on the interior of the finned structure 56. The interconnect 56' includes an aperture 561 in the finned structure 56 and a fastener 562 extending from the top of the aperture 561. The fastener 562 can engage a complimentary structure on an adjacent fin 56 to form the interconnect 56'. For example, the fastener 562 can sliding engage a complimentary structure of an adjacent fin 56. FIG. 12(f) is a perspective view of a single finned structure 56 further illustrating the aperture 561 and fastener 562. It is contemplated that the LED heatsink 51 employing interior interconnects can be generally applied to any luminaire construction and is not limited to the constructions and designs herein. Additionally, the heatsink employing interior interconnects is not limited to LED heatsink constructions and can be applied to other heatsink architectures, such as those for drivers.

Figure 13A:
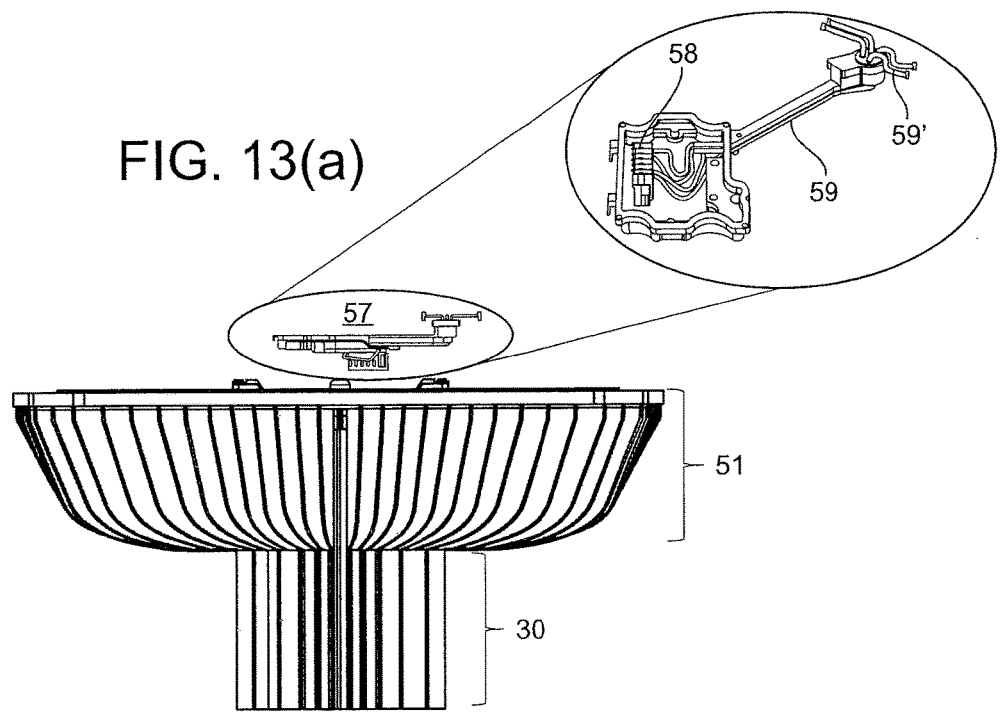
FIGS. 13(a) and 13(b) detail a wire harness and installation of the wire harness in the luminaire construction according to some embodiments.
Figure 13B:
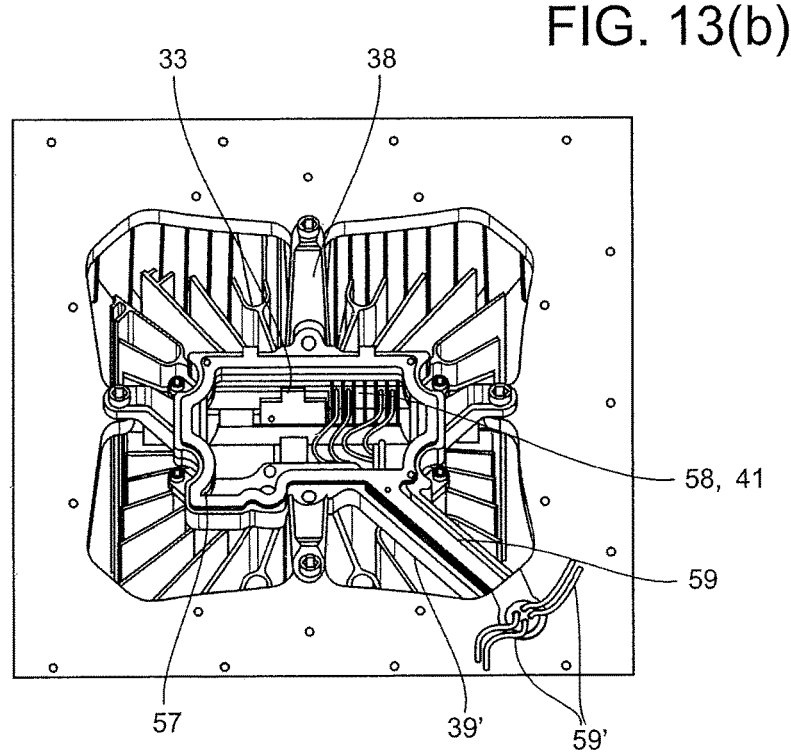

A wire harness for electrical connection of the circuit board assembly to the LED assembly is added to the luminaire construction. As illustrated in FIG. 13(a), the wire harness 57 includes a connector 58 for receiving the card edge 41 of the circuit board assembly 33. The wire harness 57 also includes a sealed pathway or gasket 59 for wires 59' leading to the LED array. In the embodiment of FIG. 13(b), the wire harness 57 couples to the endplate 38 of the driver assembly 30, wherein the gasket 59 follows the wire way 39' of the endplate 38.

Figure 14A:
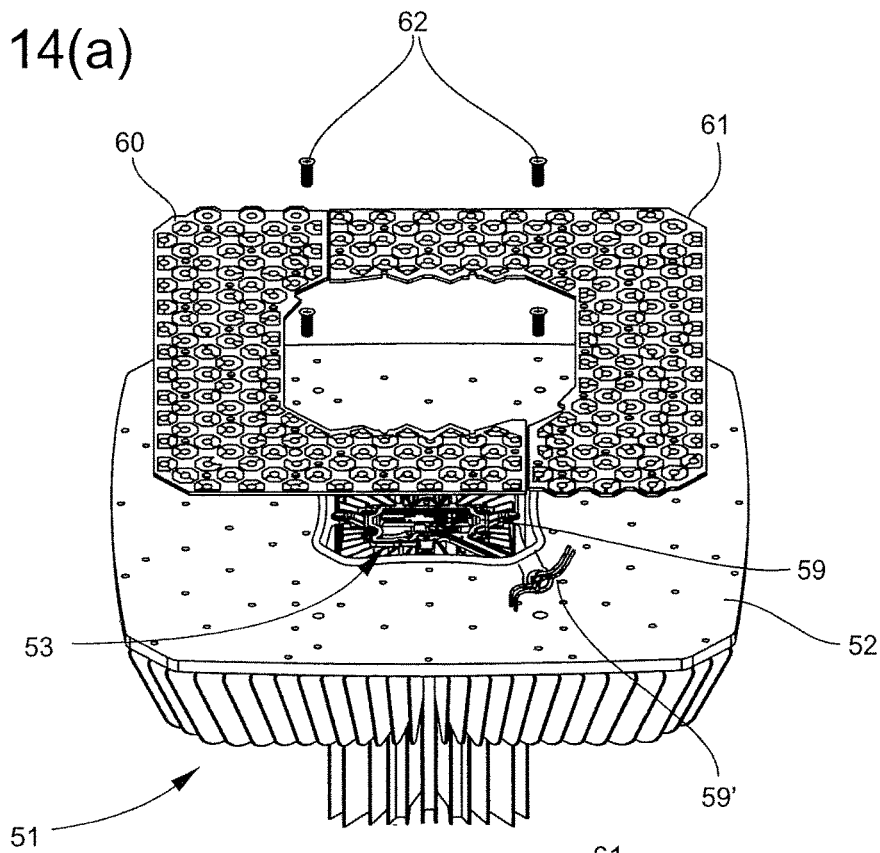
FIGS. 14(a) and 14(b) are perspective views of installation of LED boards on the heatsink base according to some embodiments.
Figure 14B:
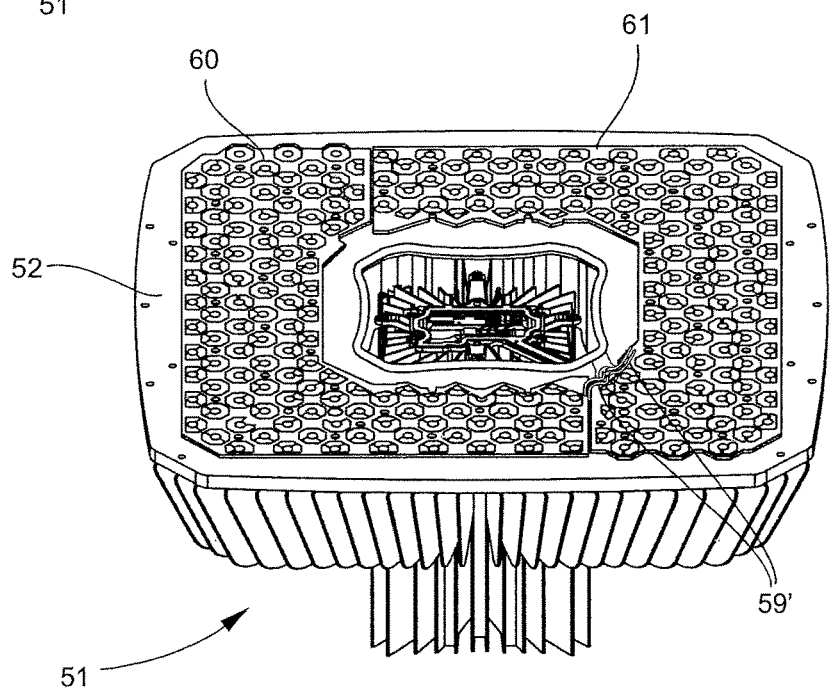
Figure 14C:
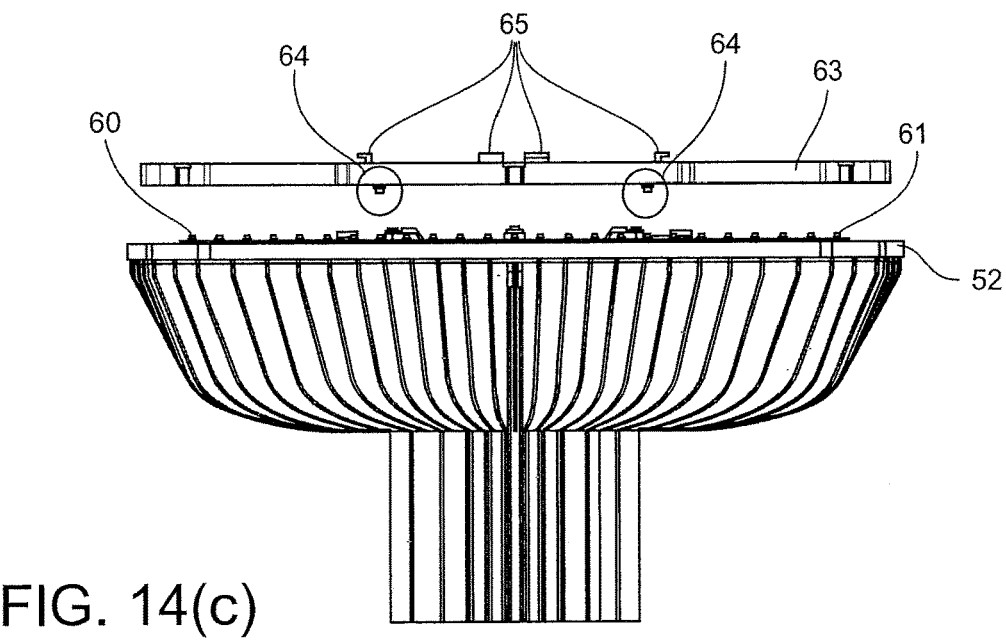
FIGS. 14(c) and 14(d) are elevation and bottom plan views respectively of installation of an LED enclosure according to some embodiments.
Figure 14D:
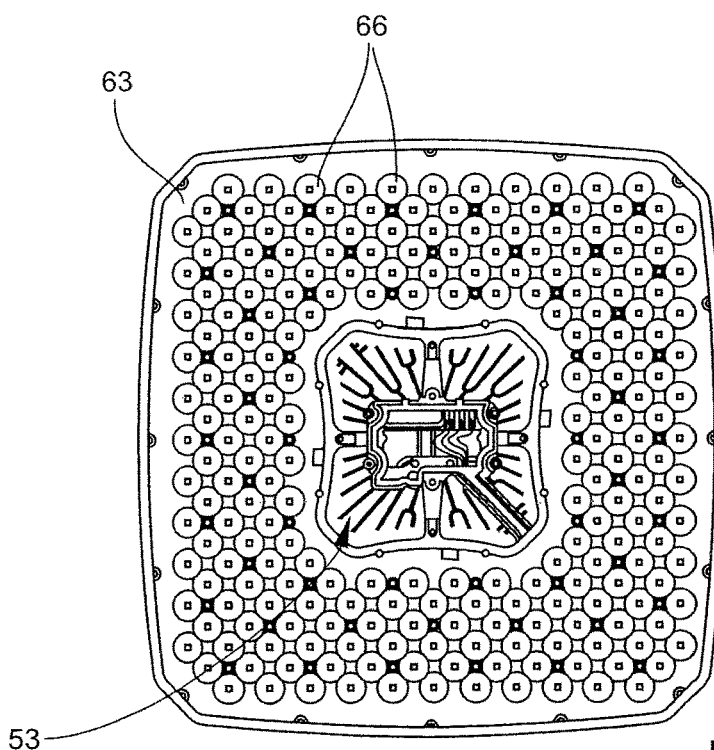

LED panels having arrays of LED elements or modules are coupled to the base 52 of the heatsink 51. In the embodiment illustrated in FIGS. 14(a) and 14(b), two LED panels 60,61 are arranged around the central aperture 53 of the heatsink base 52. LED panels can be fabricated to match any shape of the heatsink base. For example, in some embodiments, the heatsink base can be circular or elliptical, wherein the LED panels are provided arcuate shapes for coupling to the base. Pins 62 can be used to secure the LED panels 60,61 in place for rough alignment followed by electrical connection of the panels 60,61 to wires 59' of the wire harness 57. Thermal paste or glue can be used to improve the adhesion and/or thermal coupling to the heatsink 51. A LED enclosure 63 is positioned over the LED boards 60,61 and secured in place by pins 64 or other fasteners as detailed in FIG. 14(c). The pins 64 can effectuate fine alignment of the LED boards 60,61 for installation of luminaire optical components. FIG. 14(d) is a bottom plan view of the luminaire after installation of the LED enclosure 63. The LED enclosure 63 can include coupling cavities or reflectors 66 for receiving LED elements of the panels 60,61.

As used herein, the term LED may comprise packaged LED chip(s) or unpackaged LED chip(s). LED elements or modules of the panels 60,61 can use LEDs of the same or different types and/or configurations. The LEDs can comprise single or multiple phosphor-converted white and/or color LEDs, and/or bare LED chip(s) mounted separately or together on a single substrate or package that comprises, for example, at least one phosphor-coated LED chip either alone or in combination with at least one color LED chip, such as a green LED, a yellow LED, a red LED, etc. The LED module can comprise phosphor-converted white or color LED chips and/or bare LED chips of the same or different colors mounted directly on a printed circuit board (e.g., chip on board) and/or packaged phosphor-converted white or color LEDs mounted on the printed circuit board, such as a metal core printed circuit board or FR4 board. In some embodiments, the LEDs can be mounted directly to the heat sink or another type of board or substrate. Depending on the embodiment, the lighting device can employ LED arrangements or lighting arrangements using remote phosphor technology as would be understood by one of ordinary skill in the art, and examples of remote phosphor technology are described in U.S. Pat. No. 7,614,759, assigned to the assignee of the present invention and hereby incorporated by reference.

In those cases where a soft white illumination with improved color rendering is to be produced, each LED element or module or a plurality of such elements or modules may include one or more blue shifted yellow LEDs and one or more red or red/orange LEDs as described in U.S. Pat. No. 7,213,940, assigned to the assignee of the present invention and hereby incorporated by reference. The LEDs may be disposed in different configurations and/or layouts as desired, for example utilizing single or multiple strings of LEDs where each string of LEDs comprise LED chips in series and/or parallel. Different color temperatures and appearances could be produced using other LED combinations of single and/or multiple LED chips packaged into discrete packages and/or directly mounted to a printed circuit board as a chip-on board arrangement. In one embodiment, the light source comprises any LED, for example, an XP-Q LED incorporating TrueWhite® LED technology or as disclosed in U.S. patent application Ser. No. 13/649,067, filed Oct. 10, 2012, entitled "LED Package with Multiple Element Light Source and Encapsulant Having Planar Surfaces" by Lowes et al., the disclosure of which is hereby incorporated by reference herein, as developed and manufactured by Cree, Inc., the assignee of the present application. If desirable, other LED arrangements are possible. In some embodiments, a string, a group of LEDs or individual LEDs can comprise different lighting characteristics and by independently controlling a string, a group of LEDs or individual LEDs, characteristics of the overall light out output of the device can be controlled.

In some embodiments, each LED element or module may comprise one or more LEDs disposed within a coupling cavity with an air gap being disposed between the LED element or module and a light input surface. In any of the embodiments disclosed herein each of the LED element(s) or module(s) can have different or the same light distribution, although each may have a directional emission distribution (e.g., a side emitting distribution), as necessary or desirable. More generally, any lambertian, symmetric, wide angle, preferential-sided or asymmetric beam pattern LED element(s) or module(s) may be used as the light source.

Figure 15A:
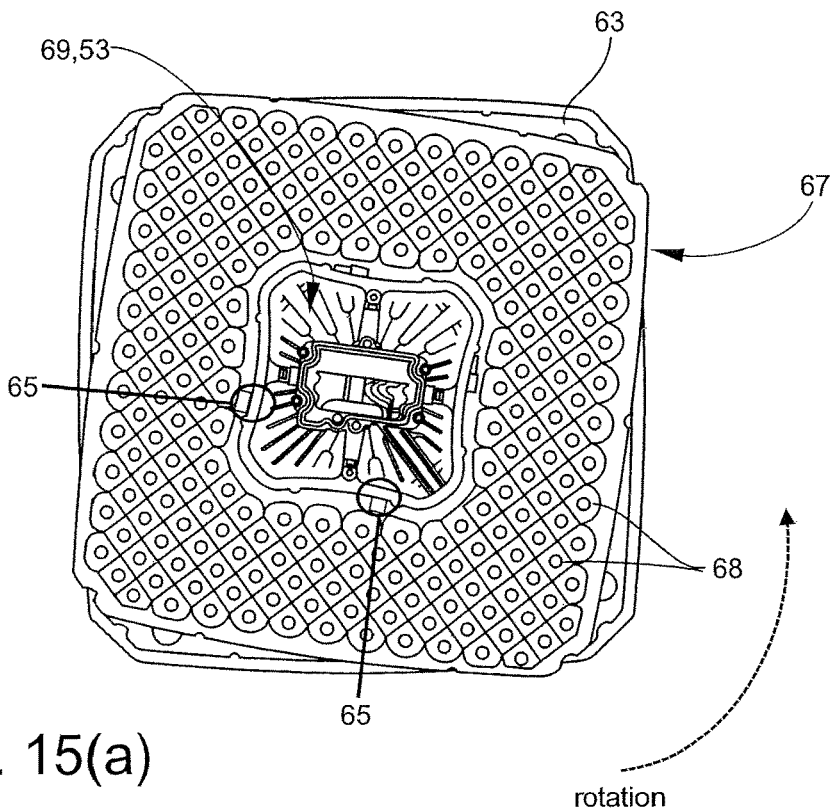
FIGS. 15(a)-15(c) are bottom plan views of a luminaire detailing installation of a monolithic optic according to some embodiments.
Figure 15B:
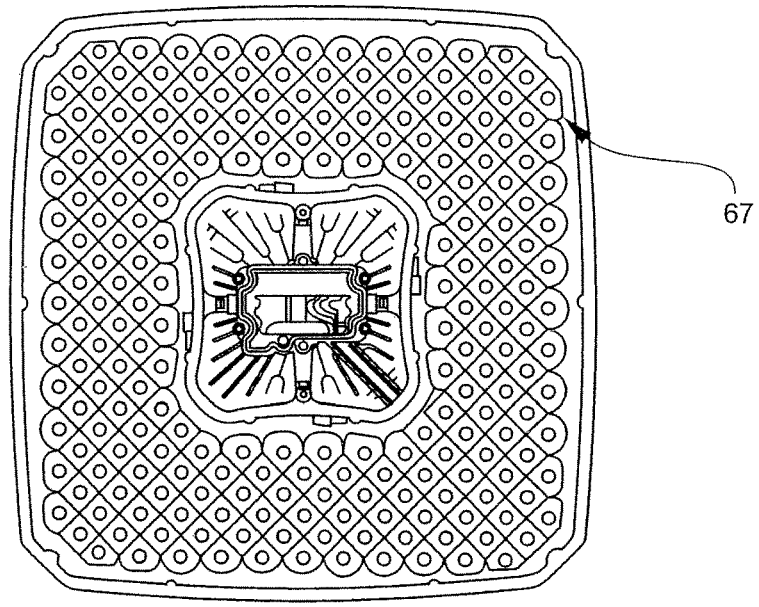
Figure 15C:
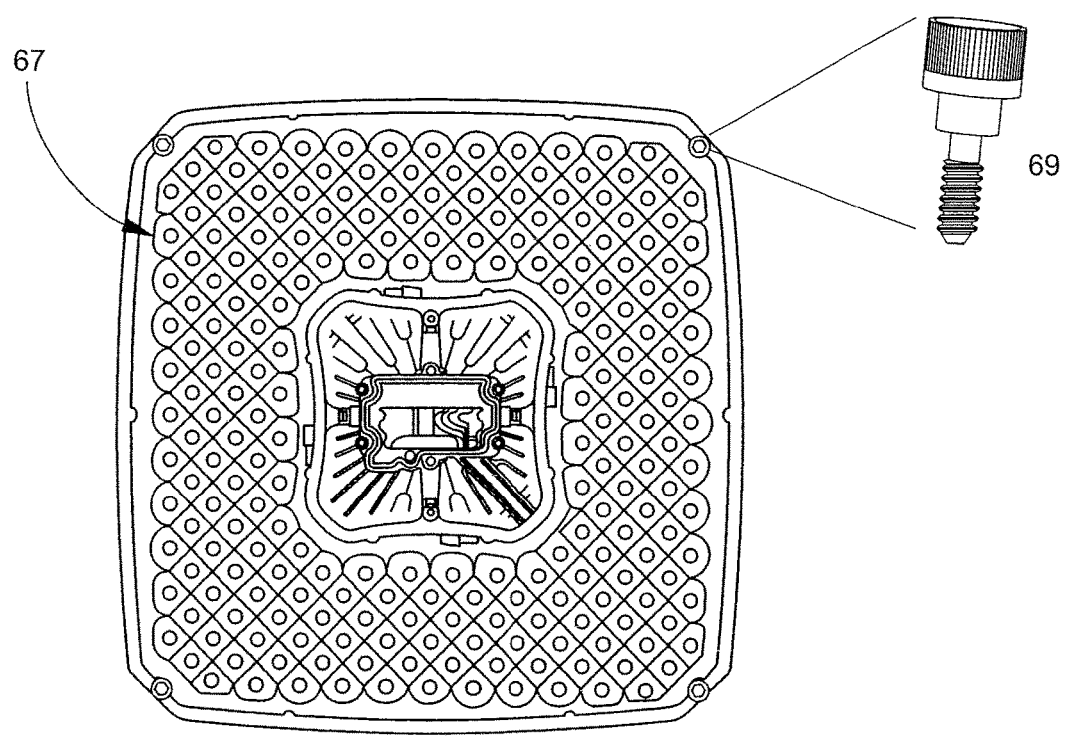

With the LED enclosure 63 in place, optical components can be installed. FIGS. 15(a)-(c) detail installation of an optic according some embodiments described herein. The optic 67 can be monolithic or single-piece to enhance installation efficiency. In some embodiments, the optic 67 can employ an array of individual lenses 68 having placement corresponding to the LED elements or modules of the LED panels 60,61 and enclosure 63. Moreover, the optic 67 includes a central aperture 69 commensurate with the central aperture 53 of the LED heatsink 51. The LED enclosure 63 can have guide features 65 permitting proper alignment of the optic 67. The guide features 65 can have any desired location on the LED enclosure 63. In the embodiment of FIGS. 15(b) and 14(c), the guide features are located along the rim of the LED enclosure 63 bordering the central aperture 53. The optic 67 is rotated to engage the guide features and placed in proper alignment as illustrated in FIG. 15(b). In some embodiments, the guide features can have design to lock the optic 67 in place. Retention pins or screws 69 can be installed along the perimeter to further secure the optic 67 as shown in FIG. 15(c). The retention screws 69 can have a raised profile enabling the screws 69 to serve as standoffs for the luminaire and prevent damage to the optic 67 if the luminaire is set on the ground during shipment and/or installation at a facility. Alternatively, for an ingress protection (IP) system of the luminaire, sealing rings 70,71 can be installed along the central aperture 53 and perimeter of the luminaire as detailed in FIGS. 16(a) and 16(b) to seal the light engine architecture. A cover (not shown) can be positioned over the driver assembly 30.

Figure 15E:
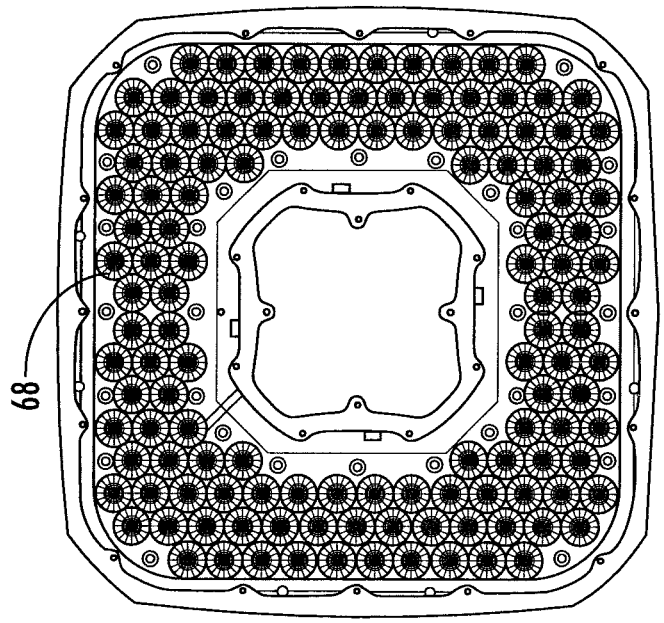
FIGS. 15(d)-(g) illustrate various LED and optic arrays according to some embodiments described herein.
Figure 15D:
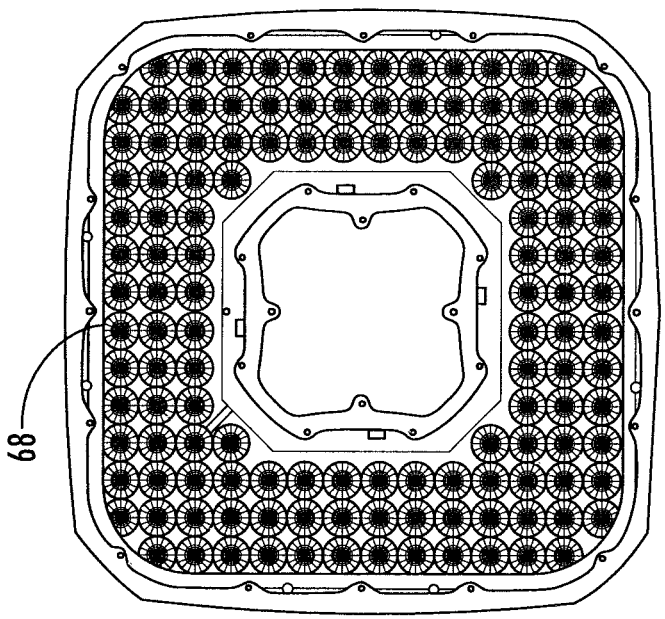
Figure 15G:
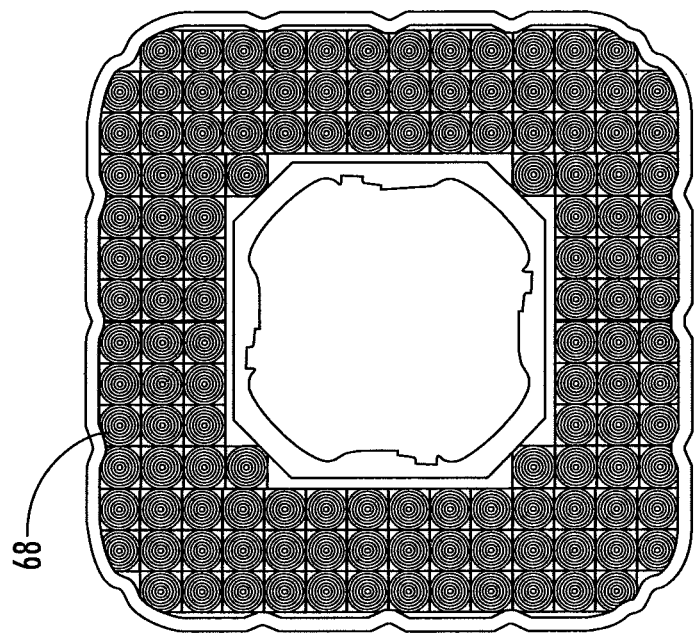
Figure 15F:
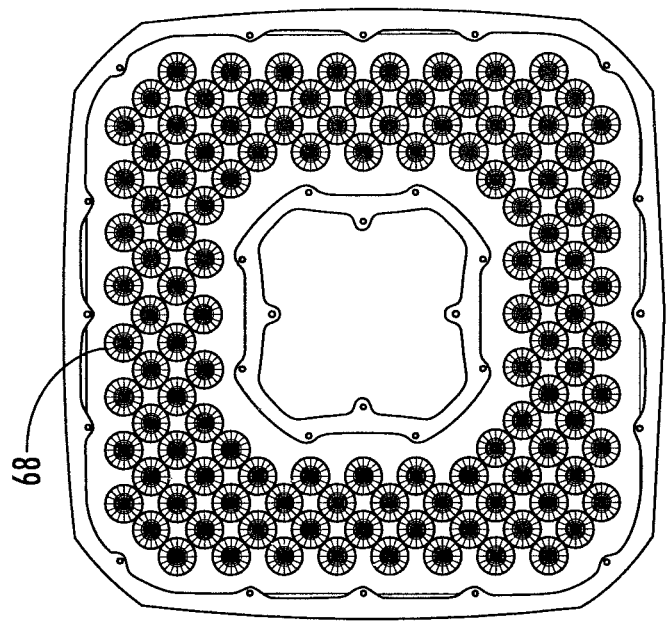
Figure 15H:
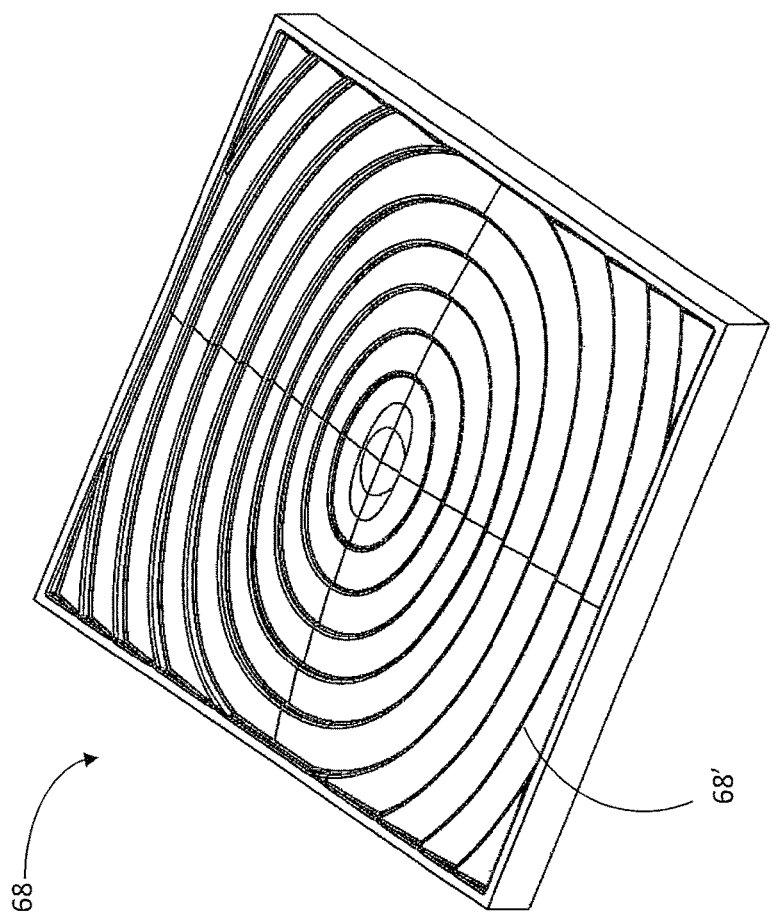
FIG. 15(h) illustrates a square Fresnel lens according to one embodiment.
Figure 16B:
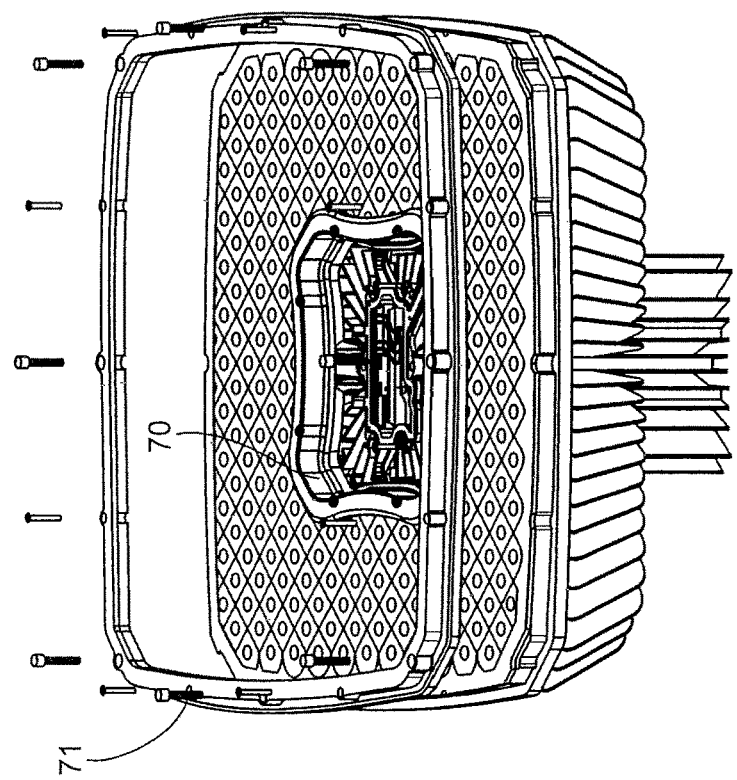
FIGS. 16(a) and 16(b) are perspective views illustrating outfitting the luminaire with ingress protection.
Figure 16A:
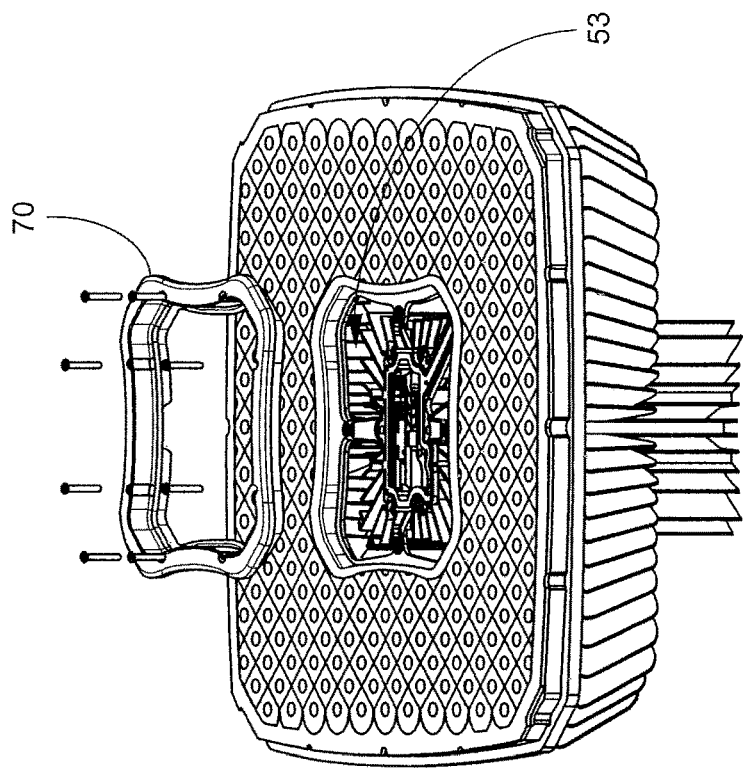

Returning to the optic 67, individual lenses 68 can have a variety of structures dependent up the design lighting distribution for the luminaire. In some embodiments, the individual lenses enable the luminaire to satisfy spacing criteria (SC) of 0.2 to 3.0 but more commonly 0.7 to 2.0. For example, individual lenses 68 can have a Fresnel design. The Fresnel design can be circular in some embodiments. In other embodiments, Fresnel design of individual lenses 68 can be square. The LED elements and associated reflectors 66 can be arranged into an array of any format. FIGS. 15(d)-(f) illustrate various array patterns of for the LED elements, reflectors of the LED enclosure and lenses 68. FIG. 15(d) illustrates a linear square pattern, FIG. 15(e) illustrates a close packed pattern of the LEDs while FIG. 15(f) illustrates a linear diagonal pattern. The Fresnel lenses 68 of FIGS. 15(d)-(f) are circular. FIG. 15(g) illustrates another pattern of LEDs and associated optics. The Fresnel lenses 68 of FIG. 15(g) are square in contrast to the round Fresnel lenses of FIGS. 15(d)-(f). FIG. 15(h) is a perspective view of a square Fresnel lens 68 according to some embodiments. As illustrated in FIG. 15(h) the Fresnel rings 68' are increasingly square in shape.

As described above, the optic 67 can be monolithic permitting facile field interchangeability. The optic 67 can be made of glass or polymeric material. In embodiments wherein the optic 67 is a formed of polymeric material, temperature of the optic can be controlled not to exceed the glass transition temperature of the polymeric material. For example, the polymeric optic can maintain a minimum distance from the LED elements or modules to maintain acceptable operating temperatures. In some embodiments, the individual lenses 68 can be domed to create the minimum distance. Alternatively, the LED enclosure 63 can have standoff dimensions to create the minimum distance. In some embodiments, the minimum distance between optic and LED ranges from 0.5-1.5 inches. Further, the minimum distance between optic and LED can be set according to LED power. In some embodiments, the LED power to optic offset distance ranges from 3 W/inch to 5 W/inch. In another embodiment, the LED power to optic offset distance ranges 4 W/inch to 5 W/inch.

The optic 67 can be used alone or in combination with other optical components to provide the desired lighting characteristics from the luminaire. For example, in some embodiments, the optic 67 can be a primary optic over the LED elements or modules. In such embodiments, a secondary optic can be employed in conjunction with the primary optic 67 to provide the desired lighting distribution. The secondary optic can include refractive elements, reflective elements as well as complex or composite optic arrangements using internal reflection surfaces and/or waveguide technology.

Moreover, depending on the embodiment, the desired light distribution can be achieved by single primary optics of packaged LEDs and/or combinations of the primary optics of packaged LEDs with single or multiple secondary optics. Optical components can be the same or vary from LED element to LED element depending on the desired lighting characteristics of the luminaire. In some embodiments, LED optics can employ waveguide technology where internal reflection of light is utilized along with light extraction features to achieve a desired light distribution.

Figure 17:
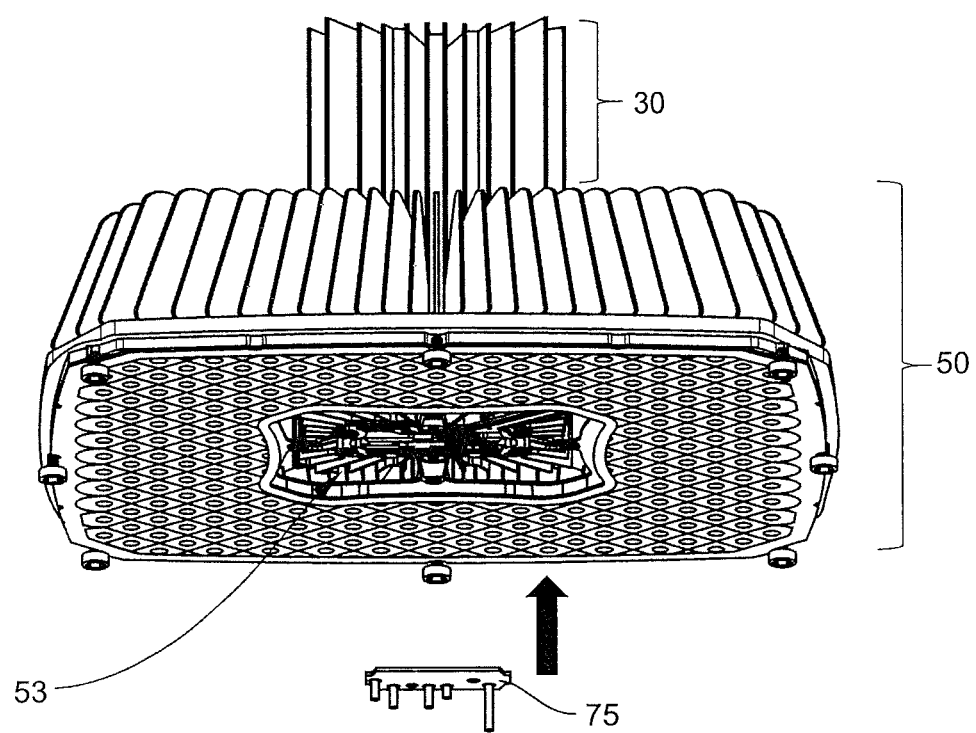
FIG. 17 is a perspective view of the luminaire detailing installation of a sensor assembly according to some embodiments.

Referring now to FIG. 17, a sensor assembly 75 can be positioned in the central aperture 53. Placement in the central aperture 53 can enable the sensor assembly 75 to connect directly to the driver assembly 30. In some embodiments, for example, the sensor assembly 75 can connect with the driver assembly 30 via a card edge assembly. In other embodiments, the sensor assembly is located at the periphery of the luminaire, requiring additional apparatus for connection to the driver. In other embodiments, the sensor assembly is separate from and not integral with the luminaire and can include networking, wired and/or wireless ling to the luminaire. Further, the sensor assembly 75 can be recessed in the central aperture 52, precluding light from the LED assembly 50 from directly striking the sensor assembly 75. The sensor assembly 75 can have one or more sensors and/or functionalities including, but not limited to, low level light imaging and/or occupancy detection. In other embodiments, other sensor assemblies can be used. Conventional PIR type occupancy detection sensors are marginally effective when operated at mounting heights greater than 50 feet, especially in environments where ambient temperatures exceed 50 degrees and or ground temperatures approach human body temperatures. Poor spatial resolution, non-imaging optics, fragile sensor materials, and/or poor temperature resolution, combined with distracters such as air currents and mount vibration can make these sensors prone to missed detections (a nuisance and safety liability) and/or false alarms (a waste of power and luminaire life).

In some embodiments, luminaires described herein incorporate an effective motion detection system based upon a visible light focal plane array such as a color or monochrome CMOS camera, in conjunction with imaging lens and digital processing. Physically, such motion detection sensor may closely resemble a camera module from a smartphone. Appropriate sensors may include those made by the Aptina division of On Semiconductor, by Ominivsion or others. Appropriate lens assemblies may result in a sensor module field of view from 70 degrees to 120 degrees. Relatively inexpensive camera modules with resolution as low as (640×480) or (1290×960) can deliver fundamental ground sampled resolution as small as 2 cm from a height of 20 feet, more than sufficient to detect major and minor motions of persons or small industrial vehicles such as forklifts.

For operation in zero light environments, supplemental illumination can be provided by optional features, such as a low-power near IR LED illuminator or a low-power mode of the luminaire itself where the luminaire remains on at 0.5% to 10.0% of full power.

In various embodiments described herein various smart technologies may be incorporated in the lamps as described in the following applications "Solid State Lighting Switches and Fixtures Providing Selectively Linked Dimming and Color Control and Methods of Operating," application Ser. No. 13/295,609, filed Nov. 14, 2011, which is incorporated by reference herein in its entirety; "Master/Slave Arrangement for Lighting Fixture Modules," application Ser. No. 13/782,096, filed Mar. 1, 2013, which is incorporated by reference herein in its entirety; "Lighting Fixture for Automated Grouping," application Ser. No. 13/782,022, filed Mar. 1, 2013, which is incorporated by reference herein in its entirety; "Multi-Agent Intelligent Lighting System," application Ser. No. 13/782,040, filed Mar. 1, 2013, which is incorporated by reference herein in its entirety; "Routing Table Improvements for Wireless Lighting Networks," application Ser. No. 13/782,053, filed Mar. 1, 2013, which is incorporated by reference herein in its entirety; "Commissioning Device for Multi-Node Sensor and Control Networks," application Ser. No. 13/782,068, filed Mar. 1, 2013, which is incorporated by reference herein in its entirety; "Wireless Network Initialization for Lighting Systems," application Ser. No. 13/782,078, filed Mar. 1, 2013, which is incorporated by reference herein in its entirety; "Commissioning for a Lighting Network," application Ser. No. 13/782,131, filed Mar. 1, 2013, which is incorporated by reference herein in its entirety; "Ambient Light Monitoring in a Lighting Fixture," application Ser. No. 13/838,398, filed Mar. 15, 2013, which is incorporated by reference herein in its entirety; "System, Devices and Methods for Controlling One or More Lights," application Ser. No. 14/052,336, filed Oct. 10, 2013, which is incorporated by reference herein in its entirety; and "Enhanced Network Lighting," application Ser. No. 61/932,058, filed Jan. 27, 2014, which is incorporated by reference herein in its entirety.

Additionally, any of the luminaire embodiments described herein can include the smart lighting control technologies disclosed in U.S. patent application Ser. No. 62/292,528 titled Distributed Lighting Network, filed concurrently herewith on Feb. 8, 2016 and assigned to the same assignee as the present application, the entirety of this application being incorporated herein by reference.

Any of the embodiments disclosed herein may be used in a luminaire having one or more communication components forming a part of the light control circuitry, such as an RF antenna that senses RF energy. The communication components may be included, for example, to allow the luminaire to communicate with other luminaires and/or with an external wireless controller, such as disclosed in U.S. patent application Ser. No. 13/782,040, filed Mar. 1, 2013, entitled "Lighting Fixture for Distributed Control" or U.S. Provisional Application No. 61/932,058, filed Jan. 27, 2014, entitled "Enhanced Network Lighting" both owned by the assignee of the present application and the disclosures of which are incorporated by reference herein. More generally, the control circuitry can include at least one of a network component, an RF component, a control component, and one or more sensors. A sensor, such as a knob-shaped sensor, may provide an indication of ambient lighting levels and/or occupancy within the room or illuminated area. Other sensors are possible, and a sensor may be integrated into the light control circuitry as described herein and with reference to FIG. 17.

Figure 18A:
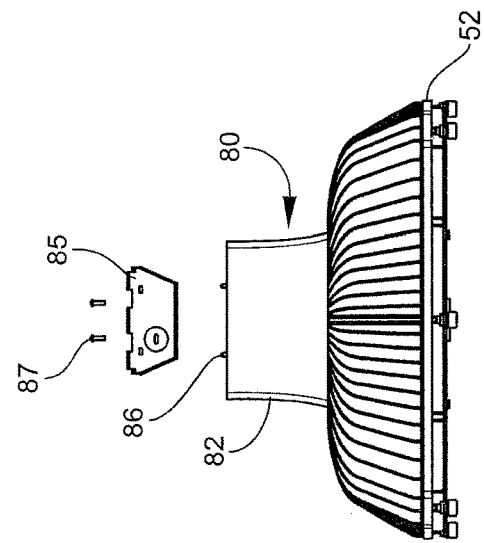
FIGS. 18(a)-18(c) illustrate installation of a shroud between the driver heatsink and LED heatsink according to some embodiments.
Figure 18B:
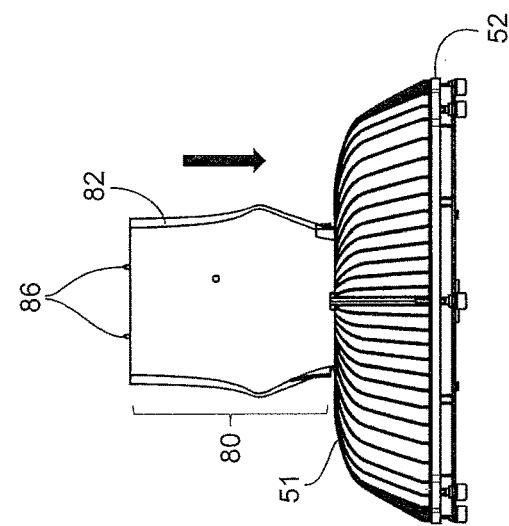
Figure 18C:
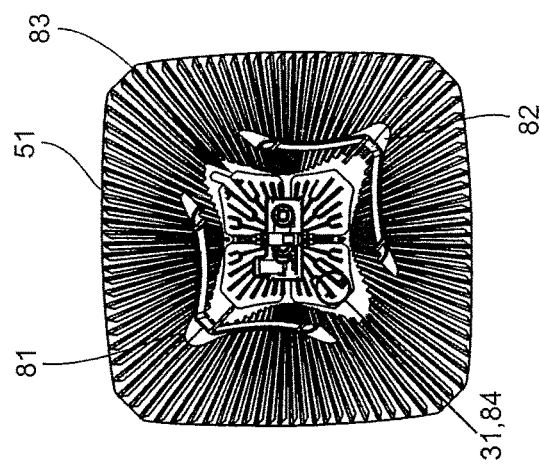

As described herein, an air envelope or shroud can be positioned between the driver heat sink and the LED heat sink separating convective cooling of the driver assembly from convective cooling of the LED assembly. FIGS. 18(a)-(c) illustrate installation of the shroud according to some embodiments described herein. Shroud plates 81,82 are inserted in spacing 83 between the driver heatsink 31 and the LED heatsink 51 and rest on the base 52 of the LED heatsink 51. The shroud plates 81,82 are brought together by pushing against the driver heatsink 31. In some embodiments, the driver heatsink can include structures 84 for engaging and/or locking the base of the shroud plates 81,82. A junction box 85 engages pins 86 on the shroud plates 81,82 locking the plates into place and completing the shroud 80. Pins or screws 87 further secure the junction box 85 to the driver assembly 30. In alternative embodiments, the shroud 80 can be provided as a monolithic piece that inserts into the spacing 83 between the driver heatsink 31 and the LED heatsink 51. In alternative embodiments, the shroud does not completely surround or enclose sides of the driver heatsink, and pathways for separate convective air currents are established along less than all sides of the driver heatsink. The driver assembly, for example, may adopt a position in vertical integration with the LED assembly where the driver is not bordered on all sides by the LED heatsink, such as a position offset from the central region of the LED assembly. In such embodiments, the shroud may not be present along sides of the driver assembly not bordering the LED heatsink.

Figure 19:
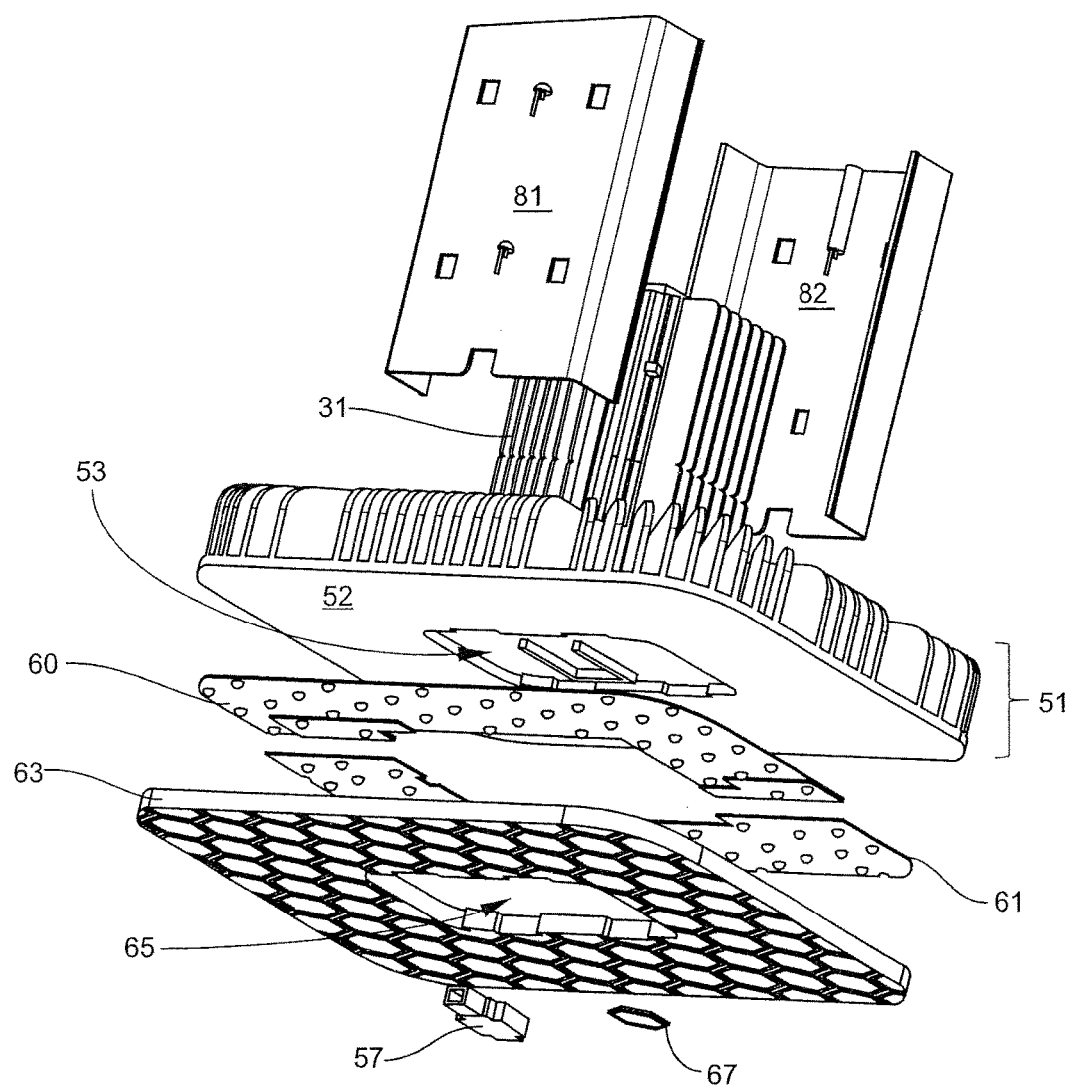
FIG. 19 illustrates an exploded view of a luminaire according to some embodiments.

FIG. 19 illustrates an exploded view of a luminaire employing a shroud according to some embodiments described herein. Shroud plates 81,82 come together to provide a shroud for thermal isolation of the driver heat sink 31 from the LED heat sink 51. As described herein, the shroud separates convective cooling of the driver assembly from convective cooling of the LED assembly. LED boards 60,61 are coupled to the base 52 of the LED heatsink 51, and a LED enclosure 63 is installed over the LED boards 60,61. Individual optics 67 are placed over each of the LED elements or modules. Individual optics 67 are in contrast to the monolithic optic illustrated and described in FIGS. 15(a)-15(c).

Figure 21:
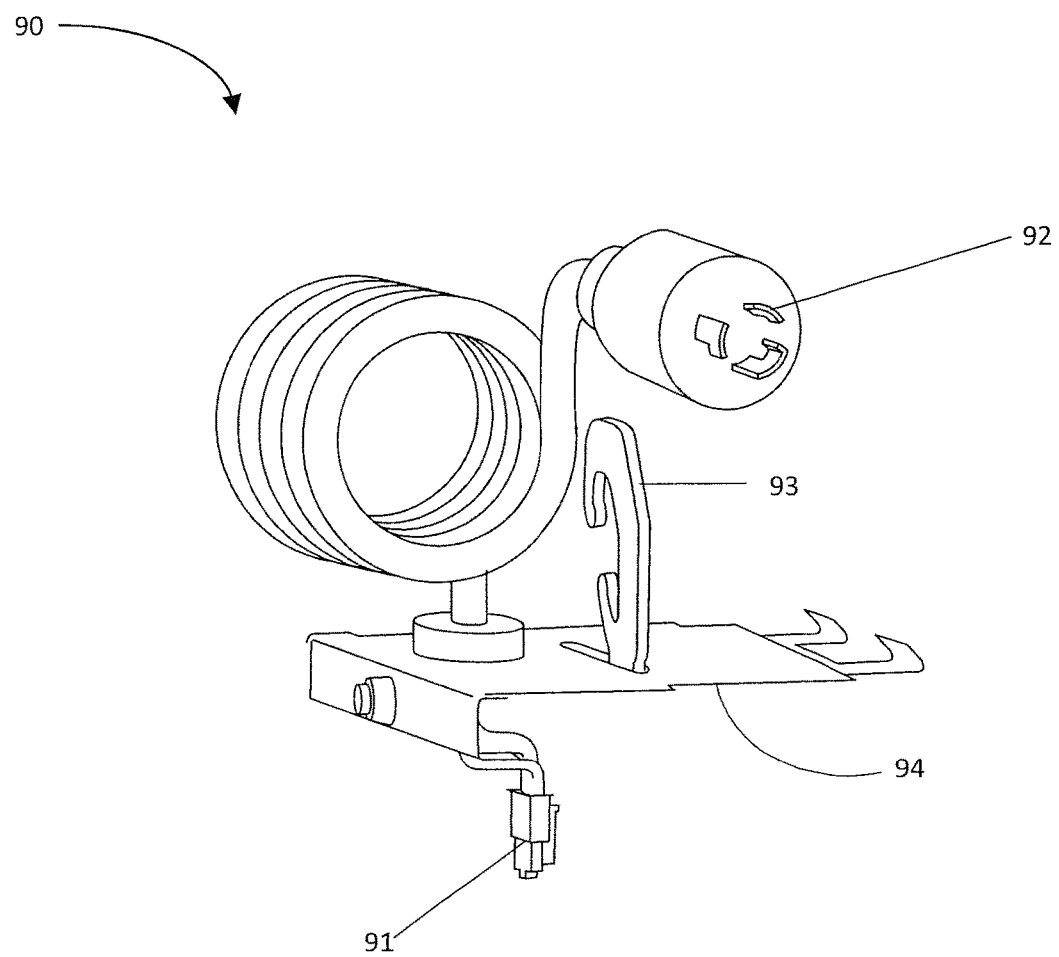
FIG. 21 illustrates a cord and plug mount for a luminaire according to some embodiments.

Luminaires described herein can include a standard fixture coupled to the junction box for mounting via various options including, but not limited to, a pendant mount, octagon box or square box as illustrated in FIGS. 20(a)-(c) respectively. Alternatively, a cord and plug fixture can be employed as detailed in FIG. 21 wherein the fixture 90 includes a connector 91 for interfacing with the driver. Design of the plug 92 is commensurate with the input voltage of the power source. The fixture 90 also includes a hook 93 for mounting the luminaire on a support. The fixture 90 couples to the junction box via plate 94. In further embodiments, a transformer can be positioned between the junction box and mounting fixture/plate.

Figure 22:
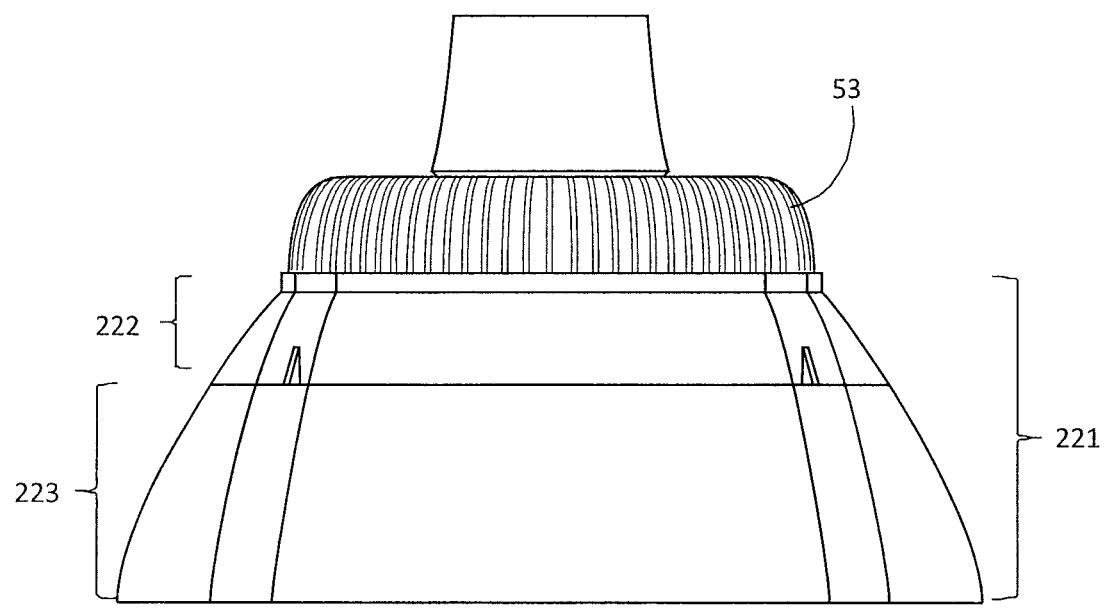
FIG. 22 illustrates an elevational view of a luminaire incorporating a glare shield according to some embodiments.

In some embodiments, luminaire described herein further comprise a glare shield. The glare shield can be a monolithic element or can be formed of two or more segments having the same or differing optical properties. FIG. 22 illustrates an elevational view of a luminaire incorporating a glare shield according to one embodiment. The glare shield 221 in the embodiment of FIG. 22 comprises an upper segment 222 and a lower segment 223. The upper segment 222 can be clear or slightly diffuse while the lower segment 223 is heavily diffuse or opaque. Moreover, the lower segment 223 can include a reflective shelf at the interface with the upper segment 222 for redirecting a portion of light upward. The upper and lower segments can be formed of any desired material including clear or translucent polymeric materials, such as acrylic or polycarbonate. Opaque segments of the glare shield can be made of opaque polymeric material or metal, such as aluminum. In some embodiments, the upper 222 and lower 223 segments are formed of the same material. In other embodiments, the upper 222 and lower 223 segments are formed of different materials. The upper 222 and lower 223 segments can also have the same cross-sectional shape or different cross-sectional shape. The upper segment 222, for example, can be generally polygonal, such as square, while the lower segment 223 is round or elliptical.

Figure 23:
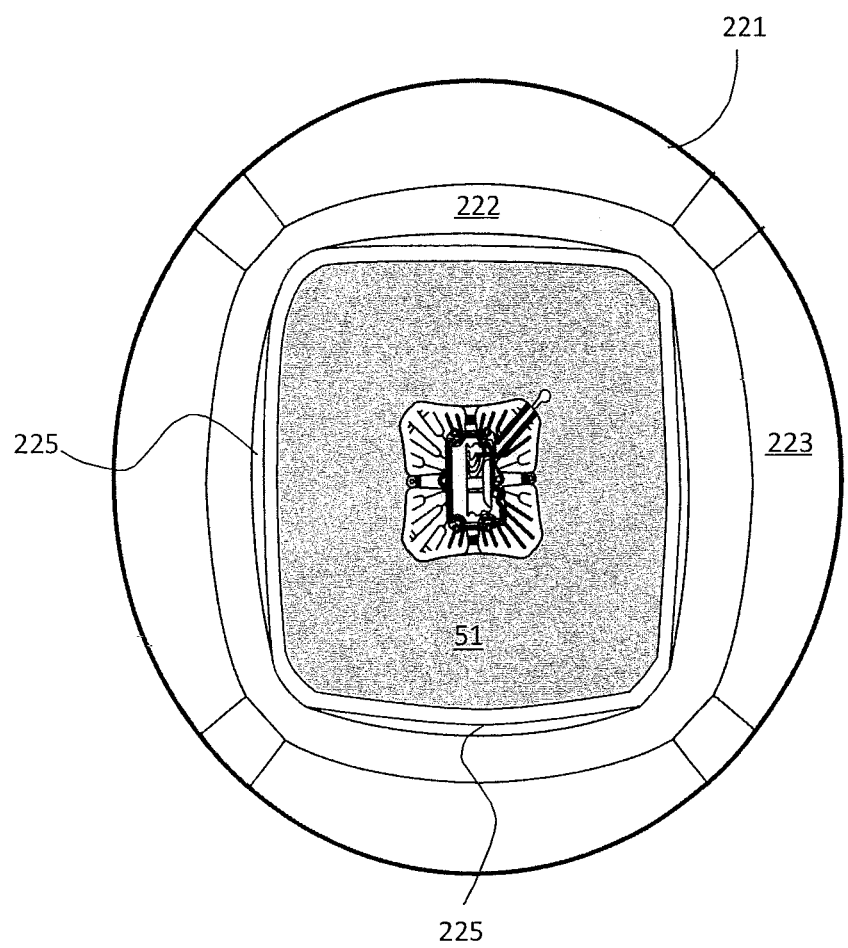
FIG. 23 illustrates a bottom plan view of a luminaire incorporating a glare shield according to some embodiments.

FIG. 23 illustrates a bottom plan view of the luminaire of FIG. 22. As illustrated in FIG. 23, the upper segment 222 of the glare shield is square and transitions into a round bottom segment 223. The square upper segment 222 engages vertices of the LED assembly 51 and/or LED heatsink 53. In some embodiments, one or more gaps 225 are created between the glare shield and LED assembly 51 permitting air flow into perimeter regions of the LED heatsink 53.

Luminaires having thermal management designs and architectures described and illustrated herein can offer various performance advantages and lighting efficiencies. In some embodiments, for example, the driver assembly 30 exhibits a thermal resistance of 0.57° C./W to 1° C./W. Driver thermal resistance is determined according to the following protocol. Thermal resistance of the driver assembly can be determined according to (temperature rise of the output bulk capacitors)/(total power dissipated by the driver). Additionally, the recess of the driver heatsink provides finned architectures dedicated to cooling capacitors of the circuit board assembly. Further, the capacitors can be positioned on the circuit board proximate the base of the driver assembly where the coolest air contacting the driver heatsink resides.

Thermal management efficiencies realized by luminaires described herein can permit operation at high ambient temperatures while extending driver and LED lifetimes. In some embodiments, luminaires described herein can have an ambient temperature rating of 60-70° C. or 65-75° C. In addition to enhanced thermal management, luminaires described herein can provide desirable lighting characteristics including an output of 15,000 to 70,000 lumens at efficiencies of at least 125 lumens per watt (LPW), such as 150-180 LPW. Table I provides additional lighting properties of luminaires having designs and constructions described herein.

TABLE I

Luminaire Lighting Properties

| Output (lm) | LPW | Correlated Color Temp. (CCT) | Color Rendering Index (CRI) |
|---|---|---|---|
| 18,000 | 140 | 4000K, 5000K | 80 |
| 24,000 | 140 | 3500K, 4000K, 5000K | 80 |
| 35,000 | 140 | 3500K, 4000K | 80 |
| 70,000 | 140 | 3500K, 4000K | 70 |

In addition to desirable lighting characteristics, luminaires described herein provide several manufacturing advantages. For example, the endplate of the driver assembly can serve as a central, unitary backbone for facile vertical integration of the driver assembly and LED assembly. While not required, a potting gasket can be used to seal the endplate to the driver heatsink. As detailed above, sealing an end of the heatsink can provide a bucket structure enabling simplified addition of potting material through the remaining open end of the heatsink.

Moreover, employment of the driver card edge can free the driver assembly of wire leads, thereby facilitating assembly of the luminaire. Similarly, the fastener coupling the circuit board assembly to the driver heat sink simplifies luminaire construction and assembly by eliminating ground wires of the driver and electrical power components coupled to the driver.

Luminaires described herein can be used in a variety of lighting applications. In some embodiments, for example, luminaires are employed in high bay applications, canopy lights, street lights and parking garage lights.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention. For example, the LED heatsink and/or driver heatsinks can be of different shapes, such as circular cross-section.

The invention claimed is:

1. A luminaire comprising:
    a driver assembly vertically integrated with a light emitting diode (LED) assembly,
        the driver assembly comprising a driver heatsink having an interior in which a circuit board assembly is positioned, and
        the LED assembly comprising an array of light emitting diodes and LED heatsink,
    wherein a barrier is positioned between the driver heat sink and the LED heat sink separating convective cooling of the driver assembly from convective cooling of the LED assembly and the LED assembly is located on an end of the driver assembly, and wherein the LED heat sink encircles at least a portion of the driver heatsink.

2. The luminaire of claim 1, wherein the driver heat sink is thermally isolated from the LED heat sink.

3. The luminaire of claim 1, wherein the barrier is a shroud.

4. The luminaire of claim 1, wherein the barrier is an air envelope.

5. The luminaire of claim 1, wherein the driver assembly is positioned over a central aperture of the LED assembly.

6. The luminaire of claim 1, wherein the driver heatsink interior includes a recess in which one or more capacitors of the circuit board assembly are positioned.

7. The luminaire of claim 6, wherein the one or more capacitors are located at the circuit board assembly base.

8. The luminaire of claim 1, wherein the driver heatsink and LED heatsink employ finned elements.

9. The luminaire of claim 1, wherein the driver assembly comprises an endcap assembly including an endplate having one or more components coupling the LED assembly to the driver assembly.

10. The luminaire of claim 1, wherein the circuit board assembly comprises a card edge for electrical connection with the LED assembly via a wire harness assembly.

11. The luminaire of claim 1, wherein the LED assembly comprises one or more LED boards.

12. The luminaire of claim 1, wherein the driver assembly further comprises a ground contact fastener coupling the circuit board to the driver heatsink.

13. The luminaire of claim 5 further comprising a sensor assembly positioned in the central aperture of the LED assembly.

14. The luminaire of claim 13, wherein the sensor assembly is recessed in the aperture, precluding light from the LED assembly from directly striking the sensor assembly.

15. The luminaire of claim 13, wherein the sensor assembly is connected directly to the driver assembly.

16. The luminaire of claim 1, wherein the LED assembly comprises one or more optical components satisfying spacing criterion of 0.7 to 2.0.

17. The luminaire of claim 1, wherein the LED assembly comprises a monolithic lens array.

18. The luminaire of claim 17, wherein the monolithic lens array is field interchangeable.

19. The luminaire of claim 1 having a light output of 15,000 to 70,000 lumens at an efficiency of at least 125 lumens per watt.

20. The luminaire of claim 19 having a color rendering index (CRT) of at least 70 and correlated color temperature of 4000K.

21. The luminaire of claim 1, wherein the driver assembly has thermal resistance of 0.57° C./W to 1° C./W.

22. The luminaire of claim 1 further comprising a glare shield.

23. The luminaire of claim 22, wherein the glare shield is formed of two or more segments.

24. The luminaire of claim 23, wherein the glare shield comprises a reflective shelf at an interface between two segments, the reflective shelf redirecting a portion of light upward.

25. The luminaire of claim 8, wherein a ratio of driver assembly height to height of finned elements of the LED heatsink is less than 1:5.

26. The luminaire of claim 8, wherein spacing between finned elements of the LED heatsink is at least 0.180 inches.

27. The luminaire of claim 1, wherein the array of light emitting diodes is a two-dimensional array.

28. A luminaire comprising:
- a driver assembly vertically integrated with a light emitting diode (LED) assembly,
    - the driver assembly comprising a driver heatsink having an interior in which a circuit board assembly is positioned, and
    - the LED assembly is located on an end of the driver assembly, the LED assembly comprising an array of light emitting diodes and LED heatsink,
- wherein a shroud is positioned between the driver heat sink and the LED heat sink separating convective cooling of the driver assembly from convective cooling of the LED assembly, and wherein the LED heat sink encircles at least a portion of the driver heatsink.

29. A luminaire comprising:
- a driver assembly vertically integrated with a light emitting diode (LED) assembly,
    - the driver assembly comprising a driver heatsink having an interior in which a circuit board assembly is positioned, and one or more arms laterally extending from an end of the driver assembly, and
    - the LED assembly comprising an array of light emitting diodes and LED heatsink,
- wherein a barrier is positioned between the driver heat sink and the LED heat sink separating convective cooling of the driver assembly from convective cooling of the LED assembly and the LED assembly is connected to the one or more arms laterally extending from the end of the driver assembly, and wherein the LED heat sink encircles at least a portion of the driver heatsink.

* * * * *